(12) United States Patent
Shinozuka

(10) Patent No.: US 7,331,790 B1
(45) Date of Patent: Feb. 19, 2008

(54) MAP (PROFILE) OF THE EARTH'S CONTINENTS AND METHODS OF MANUFACTURING WORLD MAPS

(76) Inventor: Yasuo Shinozuka, 894 Cabot La., Foster City, CA (US) 94404

( * ) Notice: Subject to any disclaimer, the term of this patent is extended or adjusted under 35 U.S.C. 154(b) by 516 days.

(21) Appl. No.: 11/033,420

(22) Filed: Jan. 10, 2005

Related U.S. Application Data

(60) Provisional application No. 60/536,040, filed on Jan. 13, 2004.

(51) Int. Cl.
*G09B 27/08* (2006.01)
(52) U.S. Cl. .................................................. 434/135
(58) Field of Classification Search ............... 434/130, 434/131, 132, 135, 147, 150, 152, 153
See application file for complete search history.

(56) References Cited

U.S. PATENT DOCUMENTS 1,458,762 A * 6/1923 Hartman .................... 434/135
2,153,053 A * 4/1939 Smith ........................ 434/135
2,352,380 A * 6/1944 Gingery ..................... 434/135
2,393,676 A * 1/1946 Fuller ........................ 434/135
4,627,622 A * 12/1986 Spilhaus .................. 273/157 R
5,222,896 A * 6/1993 Smith, Jr. ................... 434/135
5,695,342 A * 12/1997 Schaper et al. ............. 434/135

* cited by examiner

Primary Examiner—Kurt Fernstrom

(57) ABSTRACT

World maps for the earth's continents are formed from the continental hemisphere as a main body by attaching several sections of the oceanic hemispheres. Folding the hemispheres in half repeatedly makes near-flat disk maps of the both hemispheres. Other methods of producing world maps with less distortion are provided. These maps show that the earth's continents originated concurrently and did not change their shapes much since then. This also supports the inventor's hypothesis that a gigantic meteor-like body broke up in the air and fell as chunks of lava onto a proto-earth covered solely by the ocean.

10 Claims, 17 Drawing Sheets

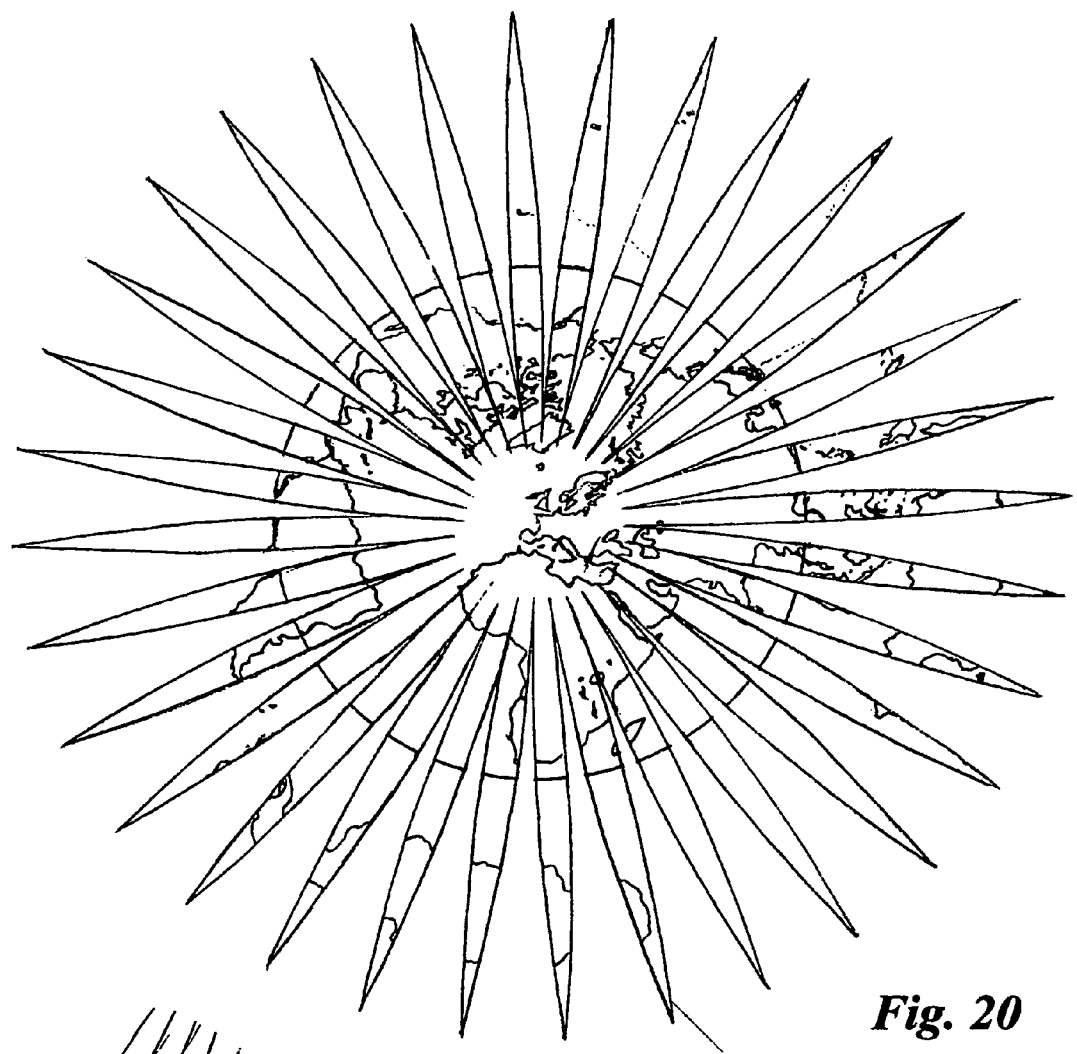
Fig. 20
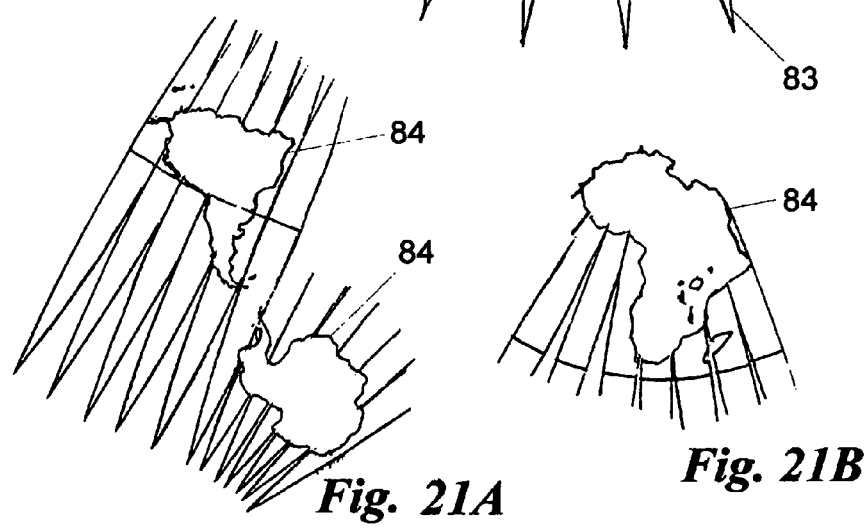
Fig. 21A  Fig. 21B

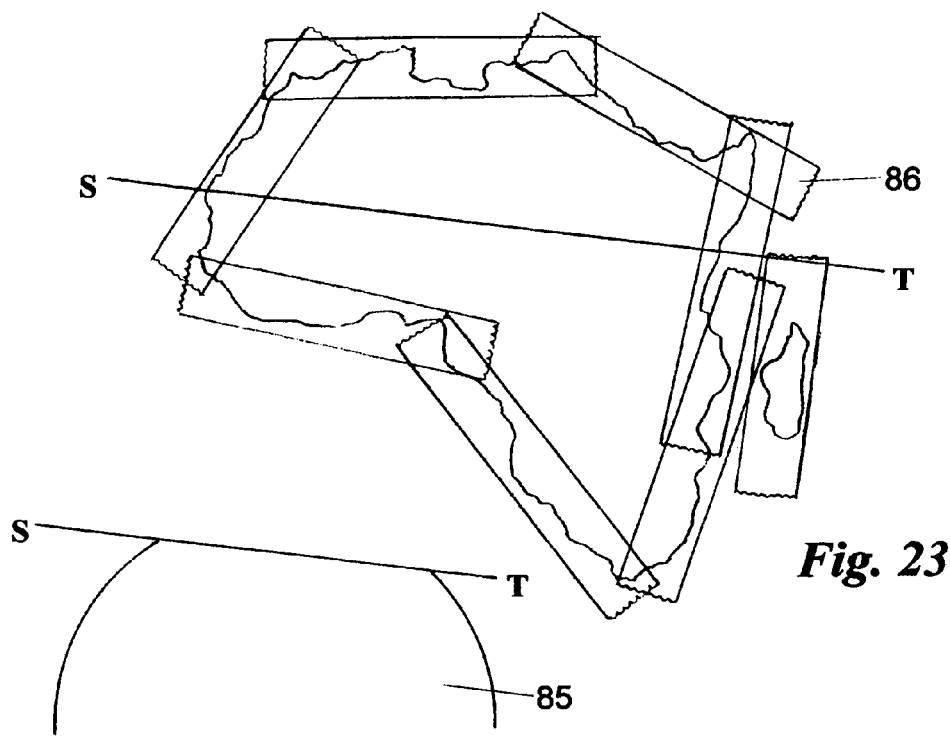
*Fig. 23*
*Fig. 22*
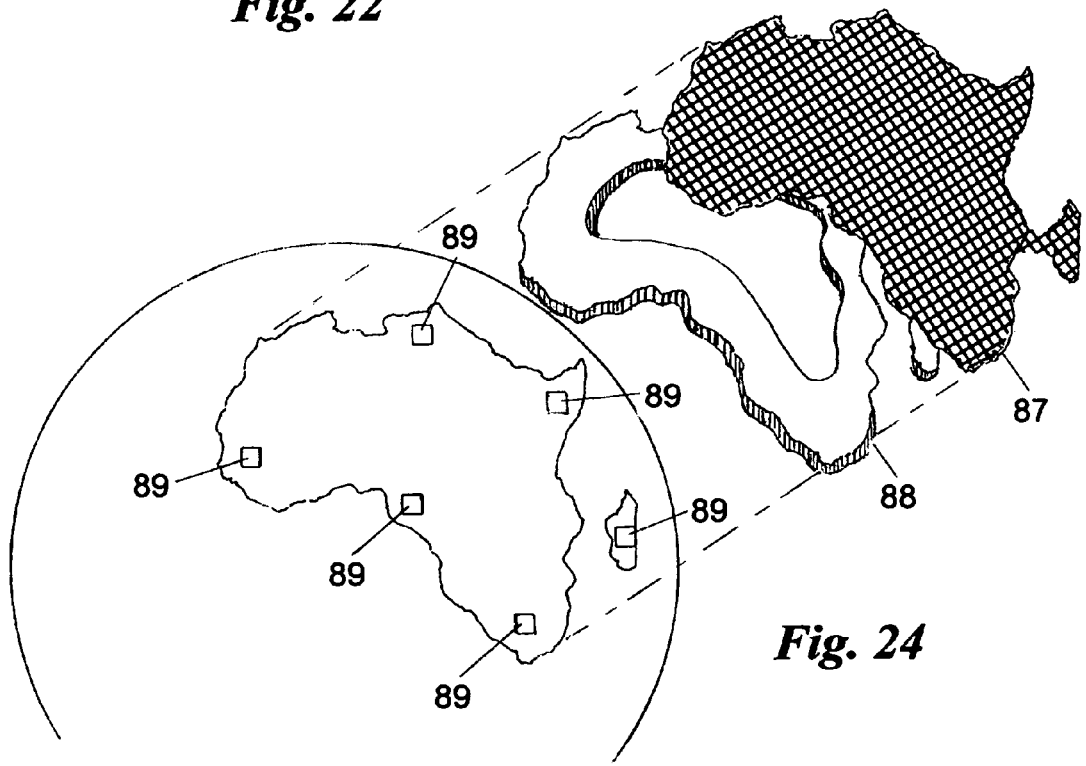
*Fig. 24*

MAP (PROFILE) OF THE EARTH'S CONTINENTS AND METHODS OF MANUFACTURING WORLD MAPS

CROSS-REFERENCE TO RELATED APPLICATIONS

This application claims the benefit of PPA Ser. No. 60/536,040, filed 2004 Jan. 13 by the present inventor.

FEDERALLY SPONSORED RESEARCH

Not Applicable

SEQUENCE LISTING OR PROGRAM

Not Applicable

BACKGROUND

1. Field of the Invention

The present invention relates to maps of the earth's continents and to methods of manufacturing such maps. More specifically, the invention relates to maps of the earth that have more accurate projections, that may be constructed by laypersons, and which may be used to support the inventor's hypothesis that the continents originated as a result of collision of a gigantic meteor-like body with an ocean-covered earth.

2. Prior Art

One of the most striking features of the planet earth is the lopsidedness of its surface. The majority of landmasses are gathered in one hemisphere (continental hemisphere) instead of dispersed all over the sphere at random. As stated in *Anatomy of the Earth*, by Andre Cailleux (English version published by The McGraw-Hill Companies, 1968), "A hemisphere centered on the estuary of the river Loire in France is almost half covered by land (47 percent) and may be called the continental hemisphere whereas the complementary half of the globe, dominated by the Pacific Ocean, bears only 11 percent land and is thus the oceanic hemisphere."

If the earth were perfectly round, seawater would have a mean level and would extend into places where the continents and other landmasses are presently situated. This presumed mean sea level is called geoid.

But then, why does the earth's actual deviation from geoid occur in a form of the lopsidedness of the continental hemisphere? Although the earth is sometimes said to be "pear-shaped", the lopsidedness of the continental hemisphere has never been referred to with a similar analogy, to my knowledge. I believe that the shape of the earth should be viewed as a "round acorn with a cap on it". Naturally, this is an exaggeration, since the anomalies of its surface are negligible in comparison with its size.

However, the earth is often regarded as an ellipsoid because it has equatorial bulge due to centrifugal force from the earth's rotation. The difference between polar and equatorial radii is 21.4 km and the difference between the highest and the lowest surface features is 20.3 km. In other words, the earth has two anomalous bulges of about the same order at the equator and on the continental hemisphere. And yet, the intrinsic cause of the hemispheric bulge is unknown. Gravitation exerts a rather negative force on the formation of a bulge, as I will discuss below. From this fact, I sought an extraneous cause: I posit that, in the early stage of the earth's history, a gigantic meteor-like body broke up in the air and fell as chunks of lava onto a proto-earth covered solely by the ocean. I named this lost heavenly body "Yasoon" (Yasuo-moon), because I originally thought it was another moon revolving around the proto-earth. Incidentally, some books call the "continental hemisphere" the "land hemisphere" and the "oceanic hemisphere" the "water hemisphere". I prefer the term "continental-oceanic hemispheres" for both, because they suggest the character of hemispheres more clearly.

Strange as it may seem, there are few theories on the origin of the earth's continents, unlike the origin of the moon. Alfred Wegener (1880-1930), famous for his theory of continental drift, published "The Origin of the Continents and Oceans" in 1915. In the book, he theorized that all of the continents were united in a single landmass called Pangaea (pan, all; gaea, earth, in Greek), which was torn apart during the Mesozoic era (about 225-65 million years ago). But he didn't discuss how and why the supercontinent Pangaea came into being. Some scientists, such as Howard B. Baker and Osmond Fisher, extended a hypothesis of George Darwin. He postulated that the earth, during a period after it formed a core, was at one time spinning extremely fast. It bulged so much at the equator that eventually a small blob spun off, becoming the moon. The resulting void or scar in the crust formed the Pacific Ocean basin. Baker, Fisher, and others theorized that the remaining continental fragments drifted toward this gigantic scar. This notion accounts for the origin of the continents somehow, but only as a by-product.

People may be so familiar with the existence of the continents that they do not question their origin. Most islanders never ask why an island is there, whereas most mountaineers never question a mountain's origin. They think the world was unchanged from its beginning. So, to almost all of them the question of the origin of the continents may never have occurred. However, considering the earth's size, the existence of the continental hemisphere or the assumption of the supercontinent Pangaea is unusual. The enormous force of gravitation should not allow such a protuberance on a round planet.

In the earth's interior, the largest layer between the crust and core is called the mantle. According to the most influential geophysical theory, although the mantle is made of rigid material, it flows and has convection currents. Geologists also believe that the continents were formed from mantle material. Could the unevenness of the earth's surface really occur in spite of the churning or mixing activity of mantle convection? If they insist that material for the continents is lighter than the mantle material, it invites another question: How could the lighter material enter into the deep interior of the earth in the first place? In order to assure the horizontal movement of the earth's crust, the mantle has to be in a plastic state. But if it is plastic, the material floating over it should have a tendency to form a flat layer like oil on water or be dispersed all over as fragments or islands by the earth's gravitational pull to the center of the earth.

Speaking of the displacement of continents instead of their origin, there were many precedents to Wegener's theory. Since circa 1600, many scientists and philosophers have noticed the similarity of the coastlines on both sides of the Atlantic Ocean. Because the most popular world maps are drawn with the Mercator projection and its variations, Europeans and Americans are familiar with the parallel coastlines of the Atlantic, as Wegener's words. "The first notion of the displacement of continents came to me in 1910 when, on studying the map of the world, I was impressed by the congruency of both sides of the Atlantic coasts." Incidentally, Japanese use Pacific-centered world maps.

Sometimes a graphic image influences people's minds more than logic. They believe explanations about continental drift, mantle convection, seafloor spreading, mantle plumes (narrow columns of hot mantle rock, more localized than convection currents), mountain building, and other geophysical concepts that scientists offer with beautifully drawn illustrations. However, none of such phenomena has been proven experimentally. We all know of thermal convection occurs in a pot of water, but insofar as I am aware, no one has successfully reproduced a convection current forming a linear spreading center like the mid-oceanic ridge in liquids.

Besides such illustrations, a map produced by Marie Tharp influenced the acceptance of the theories of seafloor spreading and continental drift. She worked with Bruce Heezen, mapping the ocean floors of the world, beginning in 1952 and completing this task in 1977. They revealed a 40,000-mile-long mountain range, called mid-oceanic ridge, curling through all the oceans of the world like a giant dragon. Especially in the Atlantic Ocean, it fits like a jigsaw puzzle with both sides of coastline. It silenced even the fiercest objections against the continental drift theory and its descendants. There are no better explanations than the one that the sea floor formed at the crest of the mid-Atlantic ridge and shoved the continents of both sides horizontally away from the ridge crest. Mark Monmonier, professor of geography at Syracuse University said, "Her maps have made sea-floor spreading seem quite natural and almost obvious. They really have been able to explain a phenomenon that a lot of people have found rather arcane and, in some case, maybe improbable. In other words, if you have a good illustration that is realistic, it can not only show how something operated, but basically presents a convincing argument that that's the way it is." As he indicated, the power of a map is enormous.

In addition, I speculate that world maps of the predominant projection methods programmed people's minds to accept the theory subconsciously. The widely used world maps show the equator in the middle and the North Pole at top. Since these maps don't show the north end of the Atlantic Ocean, which is someplace in the Arctic Ocean, and the coastlines of both sides of the Atlantic are similar, one feels as if the continents could slide horizontally along the latitude lines easily. In reality, the Arctic Ocean is contiguous the Atlantic Ocean or rather a part of it. So instead of sliding parallel, the Atlantic Ocean seems to crack open like a folding fan pivoting at a Siberian coast.

Only a globe can represent the true form of the earth. The drawing of a globe transformed on a flat surface is called a map projection. But it is impossible to transform a curved surface into a plane surface without distortion. Since there are many different types of distortion, more than a hundred map projections have been devised. They have tried to suit various needs and purposes by preserving or sacrificing certain properties of map, such as shape, area, distance, and direction.

The most popular projection for a world map is the Mercator projection, named after a Flemish cartographer. This is the only projection most laypersons know by name. The Mercator is a map projection of the so-called cylindrical type, which is drawn fully on a rectangular medium developed from a cylinder rolling around a globe. It shows almost the whole world simply and does not seem to distort shapes. That's why it has been a favorite schoolroom map. Its enlargement of northern areas makes it easy to see certain small European countries, which in another kind of map of the same size and scale would be almost invisible. Moreover, all compass directions appear as straight lines, making it a valuable navigational tool.

However, to some experts, Mercator is an abhorrent projection. John B. Garver, Jr., Chief Cartographer of the National Geographic Society, wrote in the National Geographic (December 1988), "More often than not in those days, world maps were drawn on the Mercator projection, which Robinson admits having been 'awfully sick of'. Years earlier, at the end of World War I, Editor Gilbert H. Grosvenor had also been irked by the Mercator. He called it 'atrocious' for a world reference map."

The Mercator has sown the seeds of various misconceptions. According to it, Greenland is three times its normal size and appears much larger than South America, although in fact it is only about an eighth the size. The shape of Antarctica is swollen so grotesquely that nobody can imagine the original shape of that continent.

Another important misconception deriving from the Mercator is that it fails to show the shortest, most direct route between two points on the earth's surface. For instance, people may think they fly somewhere in the Pacific near Honolulu when traveling from Los Angeles to Tokyo. Actually, they fly along the coastlines of the continents all the way via Aleutian Islands. By the same token, if they fly from New York to London, they may have an image of crossing the middle of the North Atlantic Ocean. In fact, they fly over the Canadian lands for a while and then over the northern edge of the Atlantic Ocean near Greenland.

The National Geographic Society adopted the Van der Grinten projection in 1922 as the Society's standard reference world map and Arthur Robinson's projection in 1988, but these are not optimal solutions to the Mercator problem. The Robinson projection contains a large amount of distortion: Greenland is shown 60 percent larger than it really is. The problem of the shortest air route is not solved either.

The Mollweide, the Peter, and other equal-area map projections, on the other hand, depict all regions of the earth in correct relative size. But they distort the shapes of the continents severely. Most uninterrupted world map projections, including the ones discussed above, distort and deform lands in one or more regions.

The best world map projection showing us correct relative sizes and shapes of the continents is Dymaxion Air-Ocean world map by Buckminster Fuller. His original map (U.S. Pat. No. 2,393,676, January 1946) is quite different from his later version, copyrighted in 1954. He used a non-symmetrical polyhedron, consisting of six square and eight triangular facets. But unfortunately, this original map had severe discontinuity problems. For example, the Eurasian Continent had severed top and bottom halves. The later version solved this problem by replacing the combination of square and triangular facets with twenty equilateral triangles. Using this form of an icosahedron, he was able to accurately depict the whole earth on a flat map with only a small bit of distortion distributed among the triangles uniformly without breaks in any of the continental contours.

The later version represents a great accomplishment since all the breaks occur completely within the oceans and keep the division of the landmasses to a minimum. However, this in turn means that no layperson can change the configuration at will. In fact, I could not produce a map of the continental hemisphere from it. In general, there are no books that provide any instruction how one can make a world map on their own. A map projection seems to require professional skill and a mathematical background.

Although Fuller's projection can be folded into a solid approximating the globe, the map itself does not remind us of the earth's roundness. This remainder of the roundness of the earth was claimed as a strong point for the Robinson projection, though it is elliptical.

Fuller claimed that his projection is able to show the shortest air routes between landmasses, but its ability is a limited one because the angles between outer facets make them discontinuous. For instance, one can hardly figure out the shortest air route between South America and Africa.

Although there are many continental (land) hemisphere maps on the Azimuthal (equal-area, Equidistant or perspective) projection in books and web sites, I could not find any world maps based on the continental hemisphere. Even though Frye's extension of an oblique Azimuthal Equidistant hemisphere shows interrupted landmasses in the continental hemisphere extended to complete their contours, it is not intended to produce a world map. As Richard Darlberg said, "The optimum land hemisphere centered in France excludes southern South America, Antarctica, New Zealand, Australia, and southern Asia. This creates major problems in fully representing the continents since scale variations and distortions increase markedly as coverage extends into the second hemisphere. One approach was introduced by Frye in 1895 to illustrate land-based features with the Atlantic and Arctic basins on one side and much of the Pacific Ocean omitted." In the actual map Antarctica is also omitted.

In conclusion, there are many prior-art maps in geophysics and cartography but they are not satisfactory because;
1. There is no theory describing how and why the continents take their shapes, considering the force of the earth's gravity.
2. A world map reflecting the real shapes of the continents is indispensable when discussing their origin but there is no such map.
3. Many popular world maps, especially the Mercator projection, have misled people's conceptions about the relative sizes and shapes of the continents.
4. A world map projection is too complicated and difficult for laypersons to make on their own.
5. The shortest air routes between most of the landmasses are not apparent in many popular world maps.
6. There is no full-scale world map using the continental and the oceanic hemispheres.

OBJECTS AND ADVANTAGES

Accordingly, several objects and advantages of the present invention are:
1. To provide a method of manufacturing a world map in a simple and efficient manner so that even a layperson can make a world map.
2. To provide a map of the continents on better projection than most other projections and in realistic configuration without breaks within any continent.
3. To provide a map that shows the shortest air routes between most of landmasses.

Further objects and advantages are:
4. To provide a world map that illustrates my hypothesis explaining the origin of the earth's continents due to a collision of a gigantic meteorite with an ocean-covered proto-earth.
5. To provide a map that simultaneously shows both hemispheres connected.
6. To provide flat world maps with less distortion than most current maps.
7. To provide a flattened map that conveys the earth's roundness.
8. To provide an instantaneously collapsible globe.
9. To provide concave globes that have maps on their inner walls.

Still further objects and advantages will become apparent from a consideration of the ensuing description and drawings.

DRAWINGS

Figure 6:
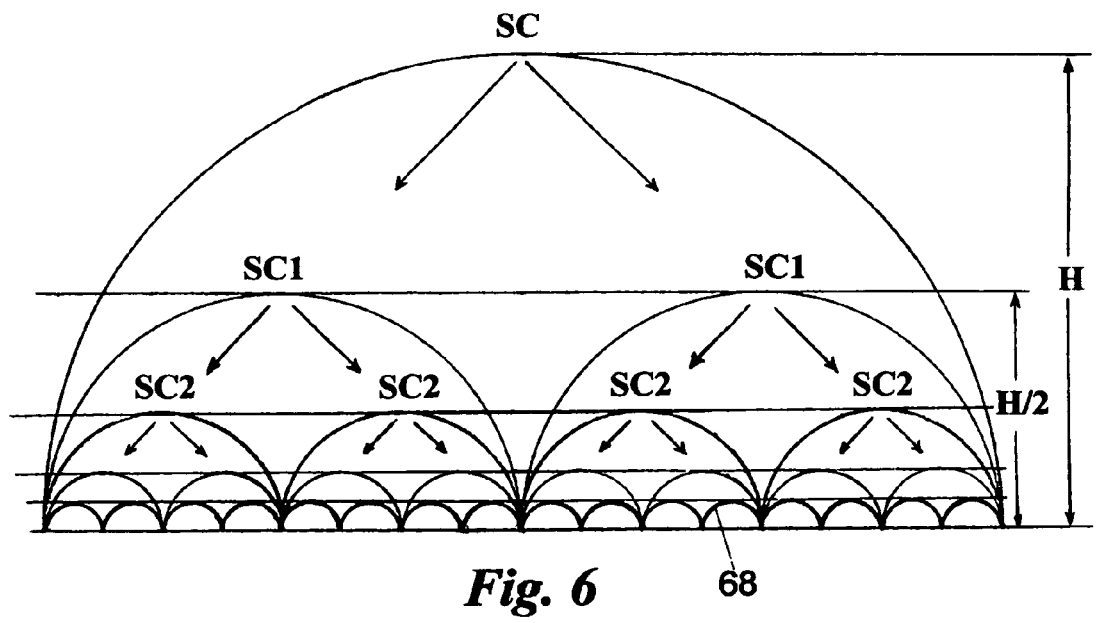
FIG. 6 is an illustration showing that we can reduce the height of a semicircle half by half, by dividing it into two small semicircles, instead of the method in FIG. 3, according to the invention.
Figure 7A:
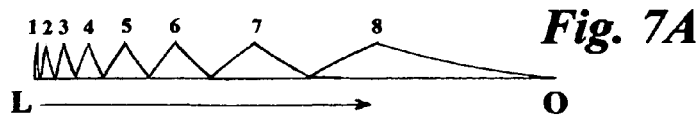
Figure 7B:
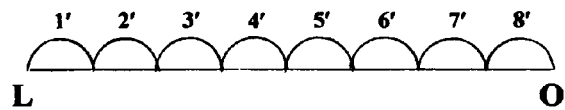

FIG. 7 is an illustration showing that the ridges of a pushed down disk in FIG. 7A seem to shift from the outer rims to the central point of a divided semicircle disk in FIG. 7B. FIG. 7A is a left half section of the lowest row of FIG. 3. And FIG. 7B is a left half section of the lowest row of FIG. 6.

Figure 8C:
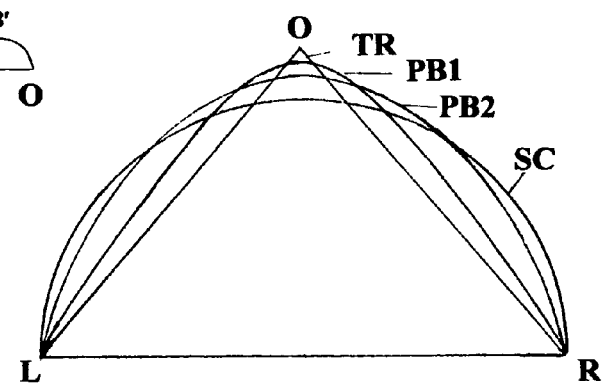
Figure 8D:
Figure 8E:

FIG. 8C is an illustration showing that a semicircle can be replaced by many parabolic shapes or a triangle as far as the lines are the same length. FIGS. 8D and 8E are illustrations showing that the semicircular disk of FIG. 7B can be replaced by parabolas and triangles respectively.

Figure 9F:
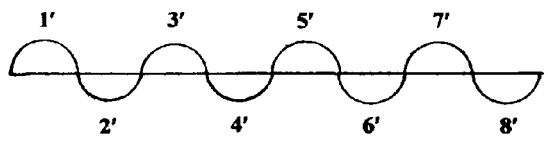
Figure 9G:
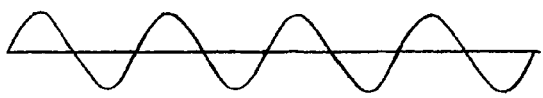

FIGS. 9F and 9G are illustrations showing that semicircular disk of FIG. 7B and the parabolic disk of FIG. 8D can be replaced with wavy patterns by alternating their ridges.

Figure 10:
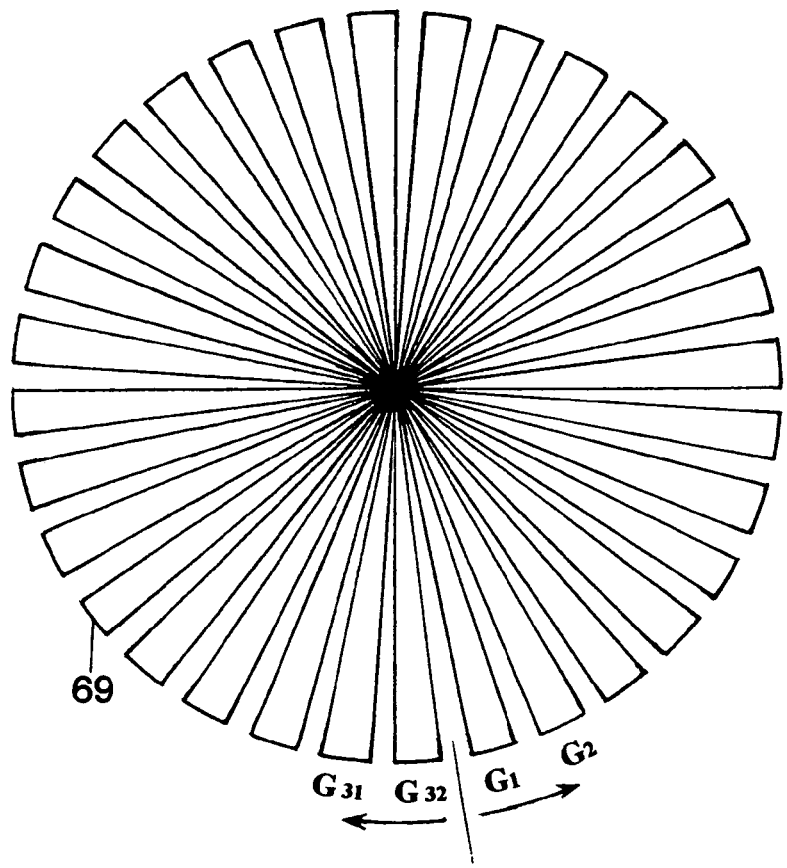

FIG. 10 is an illustration showing the hemisphere with 32 gores, reflecting 32 curved sections of a globe. This figure is developed from the triangular disk of FIG. 8E.

Figure 11:
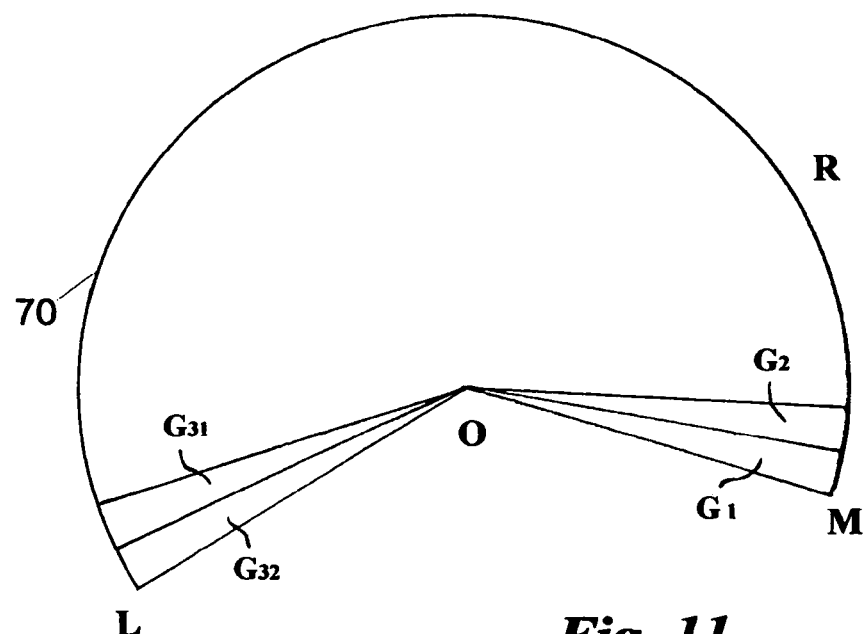

FIG. 11 is an illustration showing that the gores in FIG. 10 are gathered up to a wide-open fan shape by vacating spaces between the gores.

Figure 12:
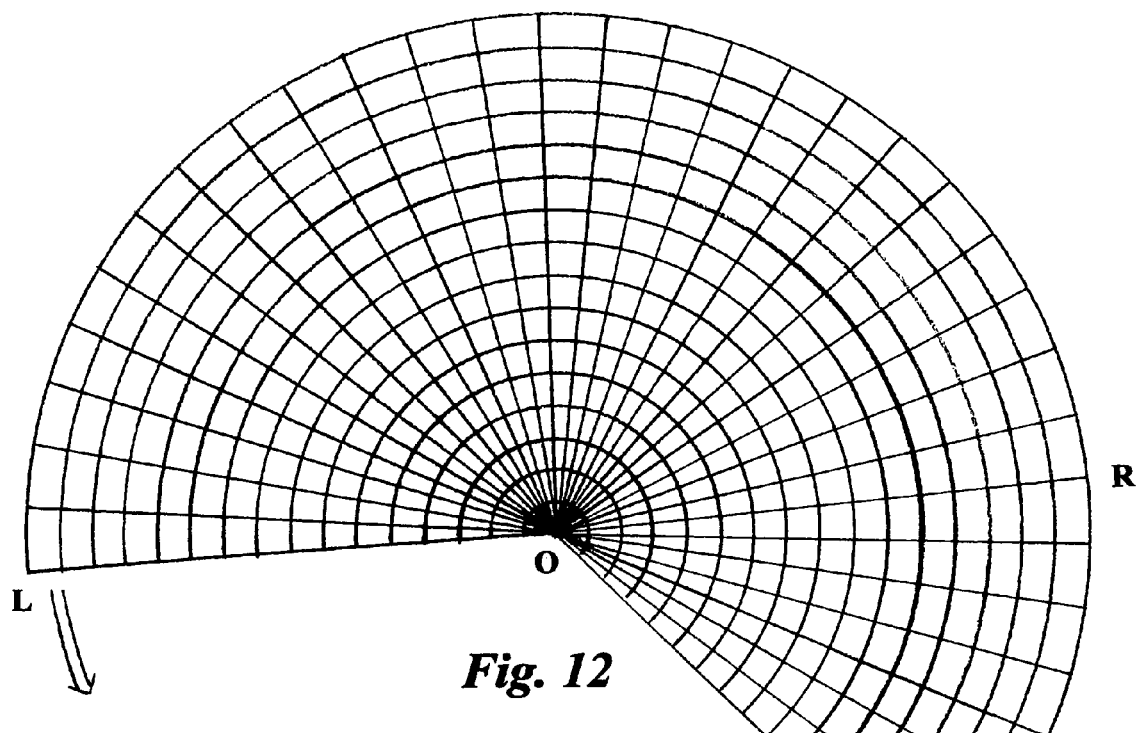

FIG. 12 is an illustration showing a graticule made on the fan-shaped gores of FIG. 11.

Figure 13:
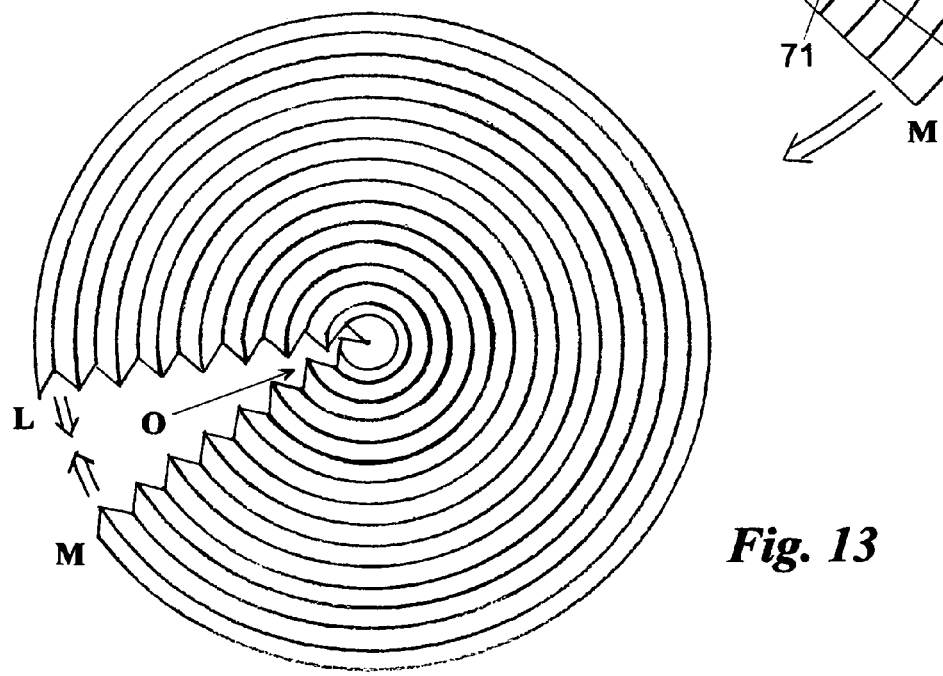

FIG. 13 is a view similar to FIG. 12 but wherein points are pulled inward while the concentric arcs are folded up and down alternately.

Figure 14A:
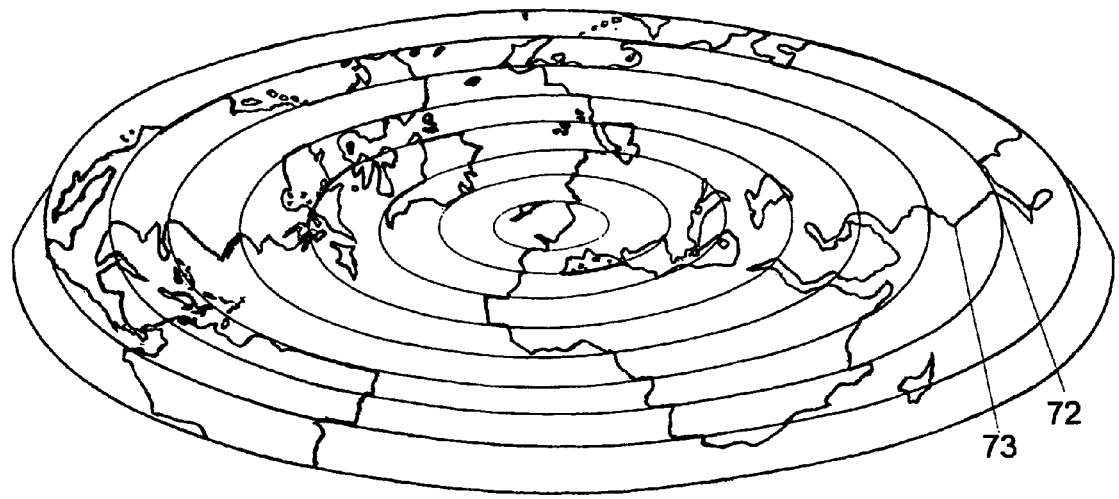
Figure 14B:
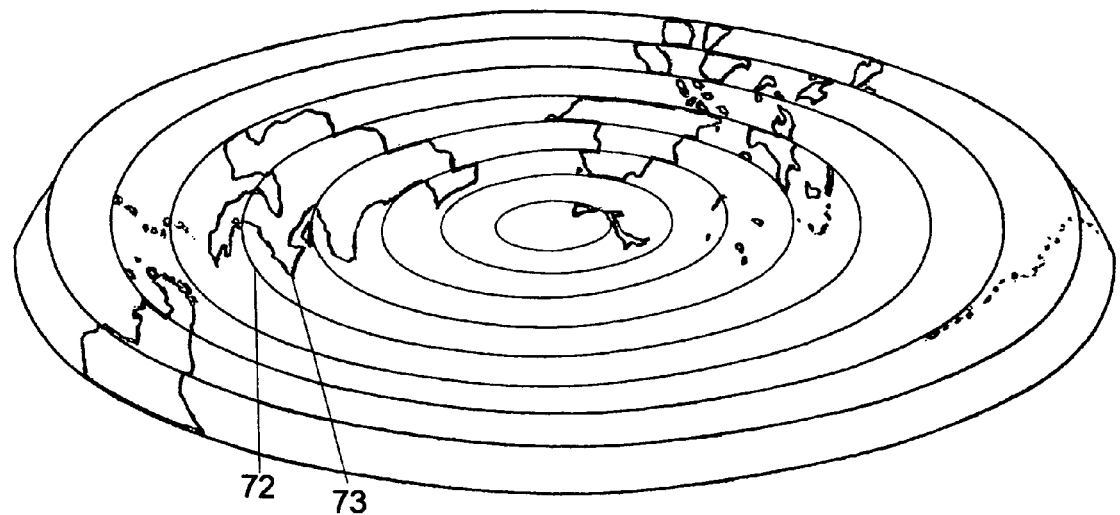

FIG. 14A is a perspective view of a nearly flat continental hemisphere derived from FIG. 13; FIG. 14B shows an oceanic hemisphere.

Figure 1:
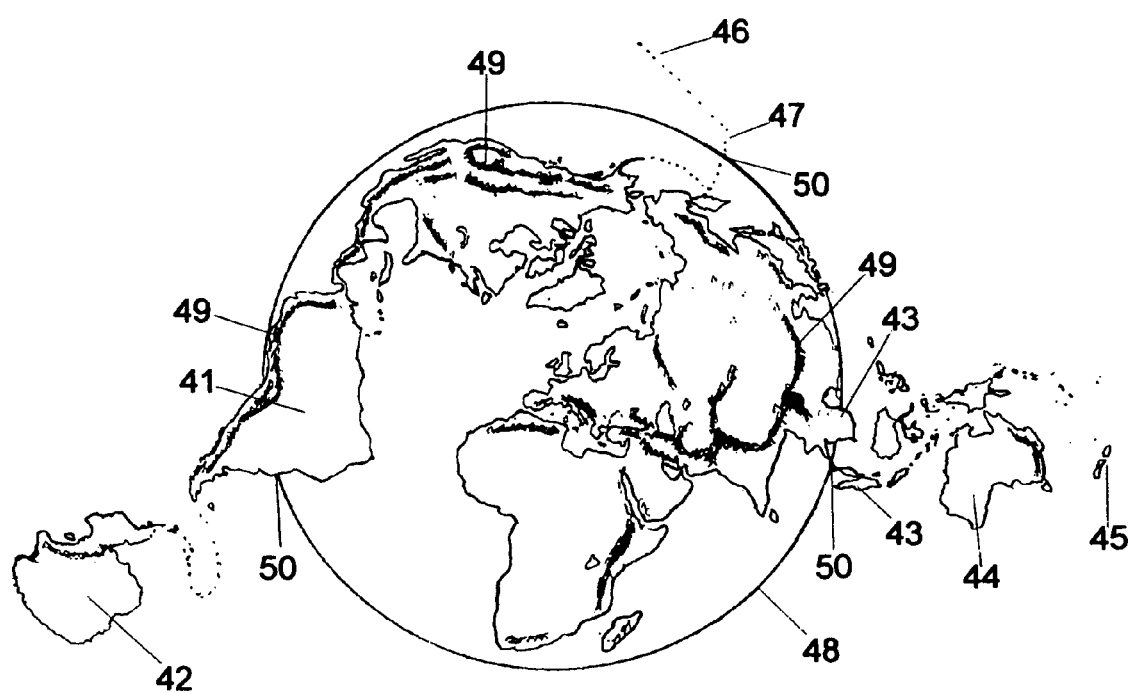
FIG. 1 is a map of the earth's continents, made according to a preferred embodiment of the invention and produced from the map of FIG. 2.
Figure 15:
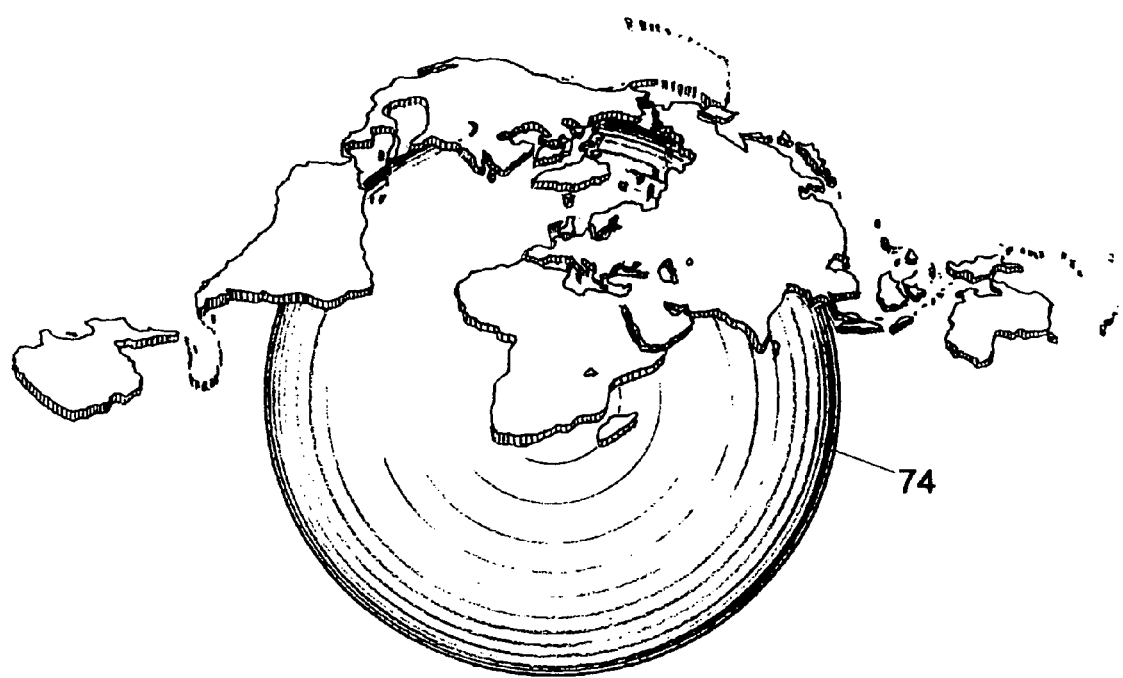

FIG. 15 is the same map as the one shown in FIG. 1 but viewed diagonally.

Figure 16:
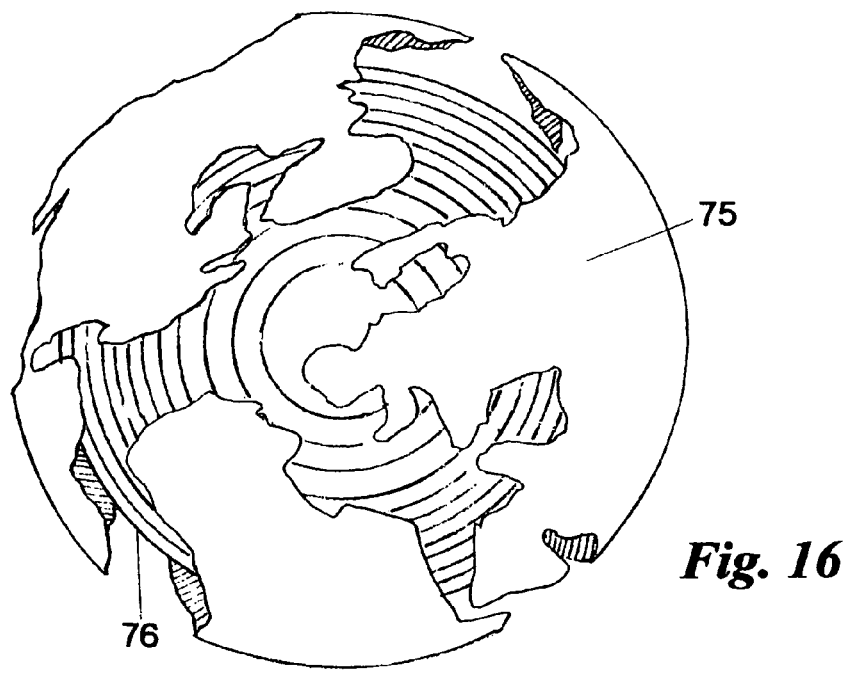

FIG. 16 is an illustration showing that the continents of FIG. 1 or FIG. 15 can be rounded into a smaller sphere.

Figure 17:
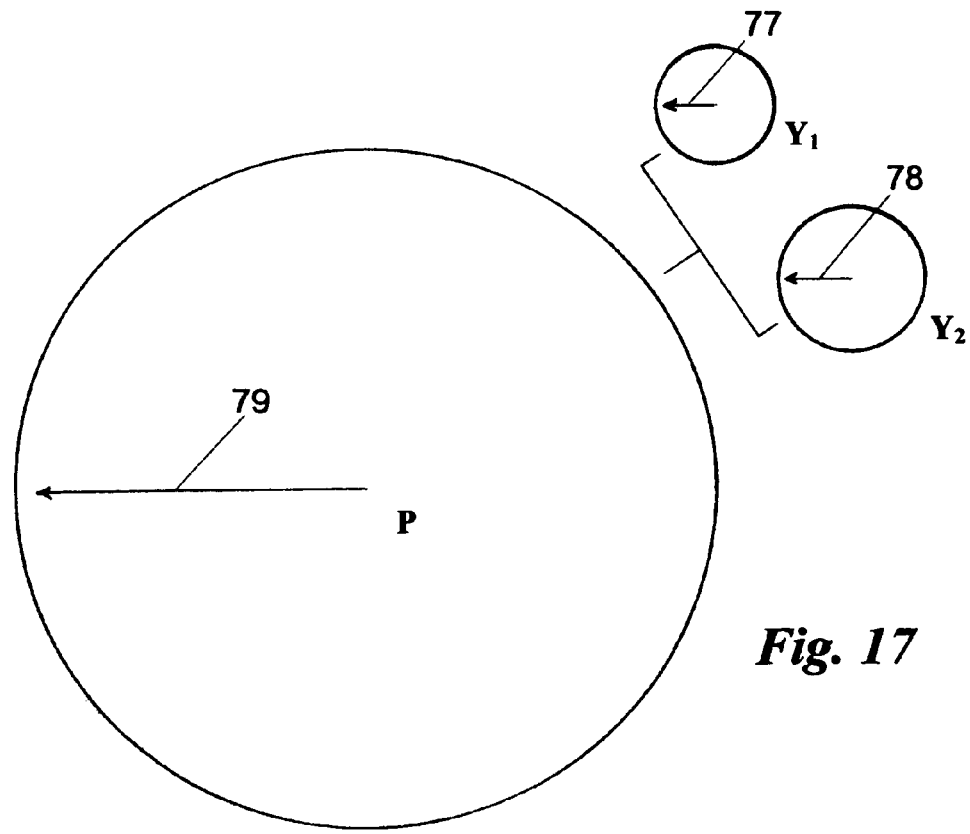

FIG. 17 is an illustration showing the relative size of Yasoon to the proto-earth, according to the invention.

Figure 18:
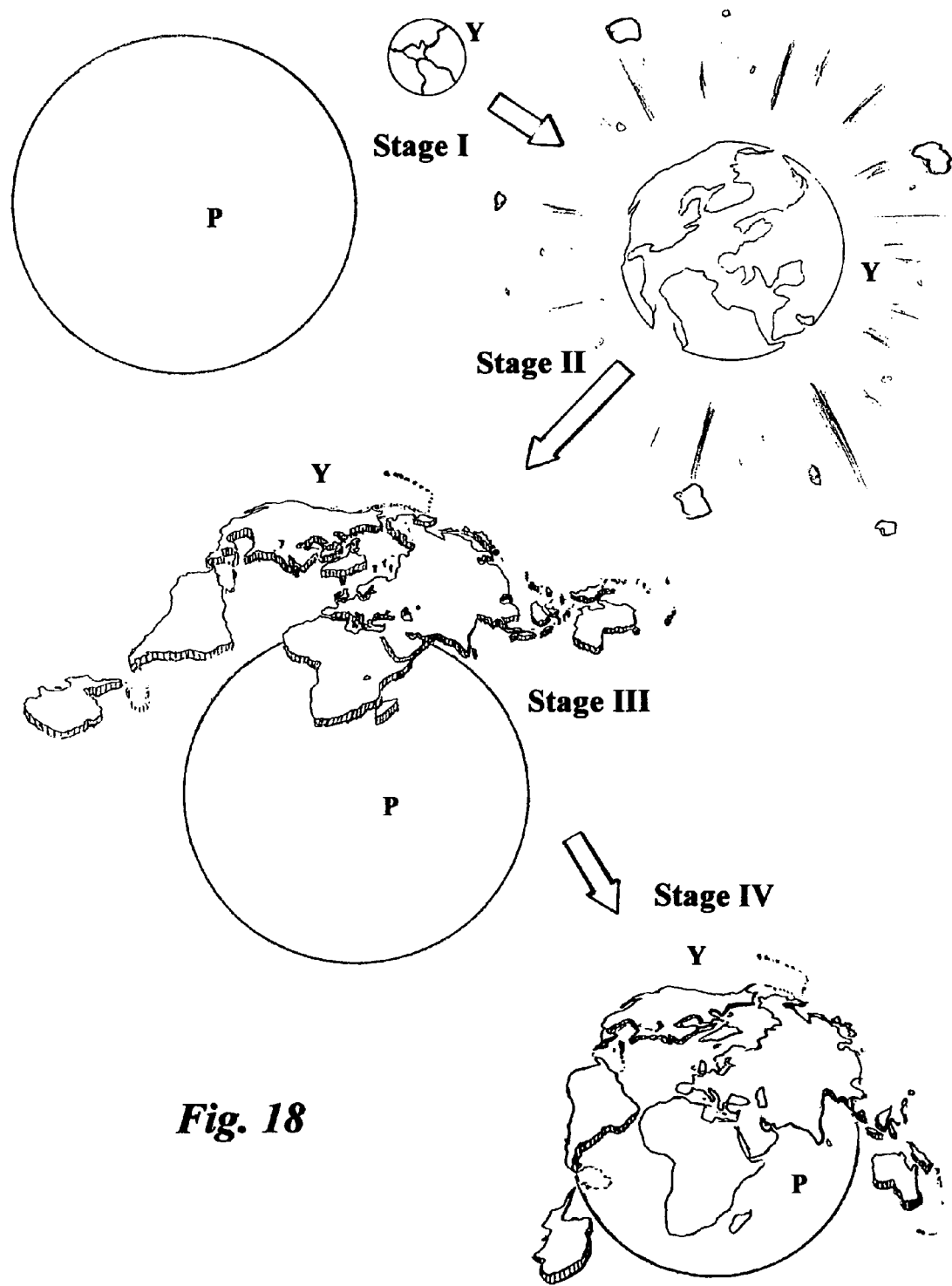

FIG. 18 is an illustration showing how Yasoon coalesced with the proto-earth. Yasoon and the proto-earth in reversed order from FIGS. 17 to FIG. 15 explain the process of coalescence step by step.

Figure 19:
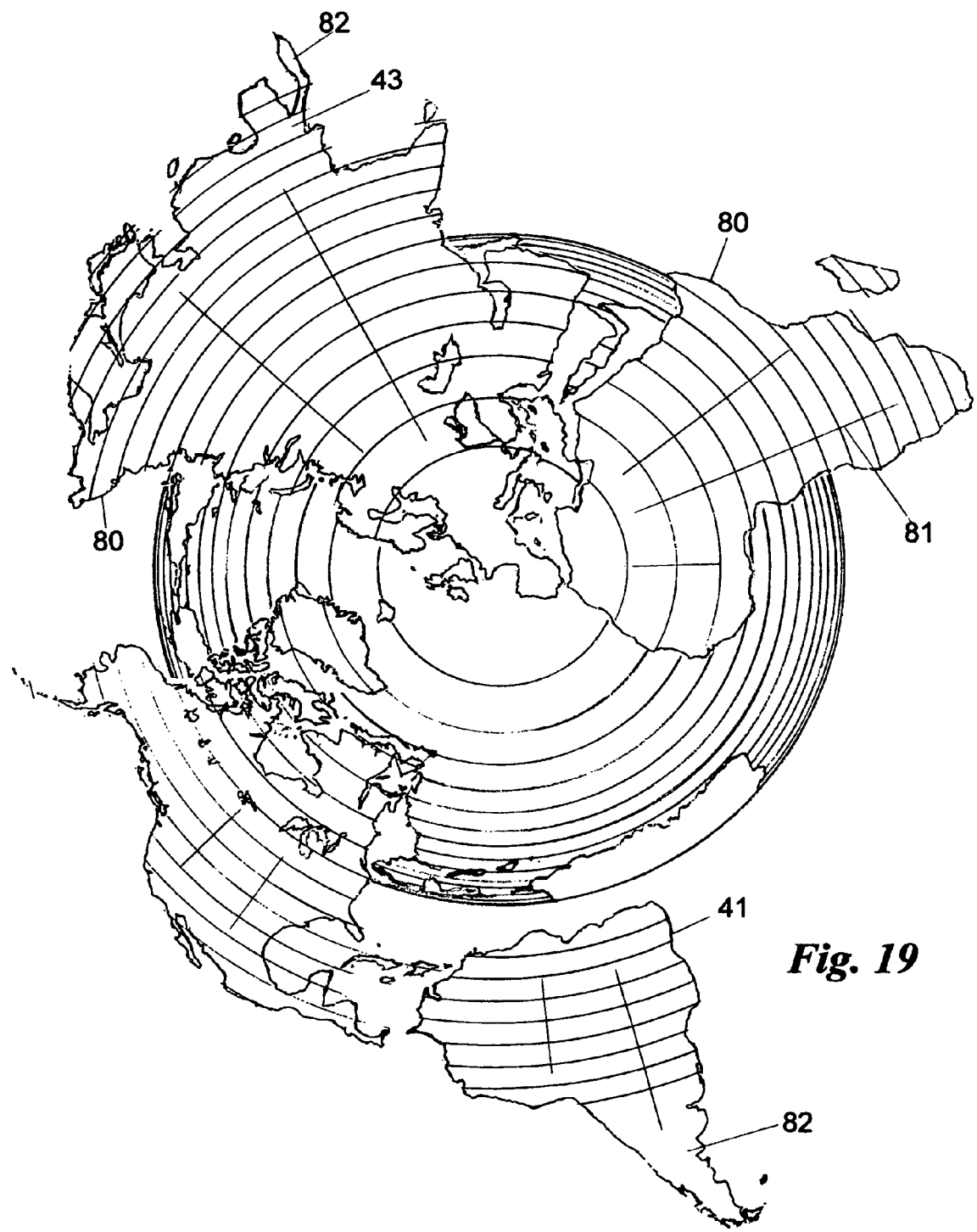

FIG. 19 is an illustration showing the effect when the outer contours of the continents of a globe are cut and stretched outward, according to the invention.

FIG. 20 is a rosette of gores on which the contours of lands are drawn, according to the invention.

FIG. 21 is an illustration showing that gathering the gores of FIG. 20 appropriately forms the contours of the continents.

FIG. 22 is a cross section of a globe when a convex part of a continent is shaved off, according to the invention.

FIG. 23 is an illustration showing the African continent covered by a clear plastic with its contour fixed by pieces of transparent adhesive tape, according to the invention.

FIG. 24 is an extension of FIG. 23 showing how to make a pattern of a continent as a part of a convertible globe using the African continent as an example, according to the invention.

Figure 25:
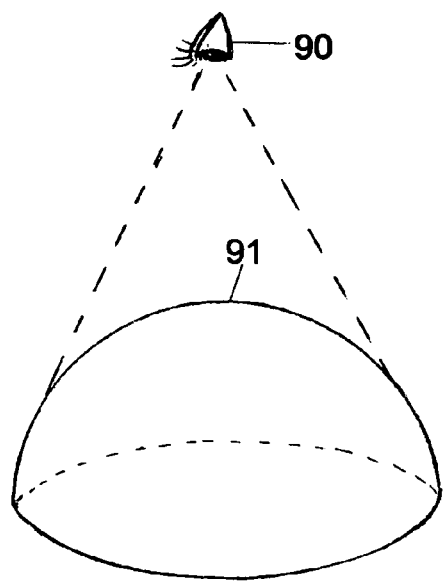

FIG. 25 is an illustration showing why all the figures of a hemisphere cannot be seen on a globe, according to the invention.

Figure 26:
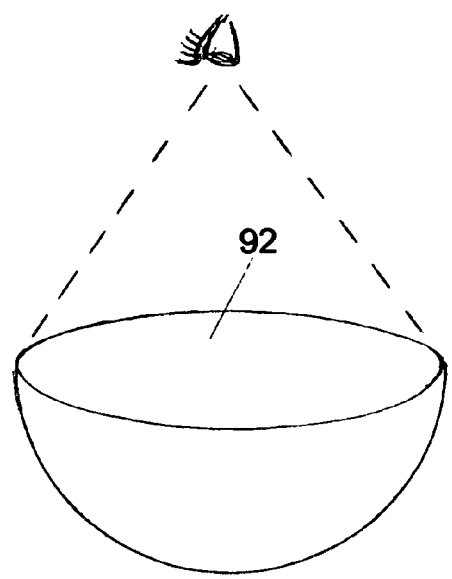

FIG. 26 is an illustration showing that if the surface of a globe is concave in reverse of FIG. 25, we can see the entire hemisphere of the globe at a glance.

Figure 27:
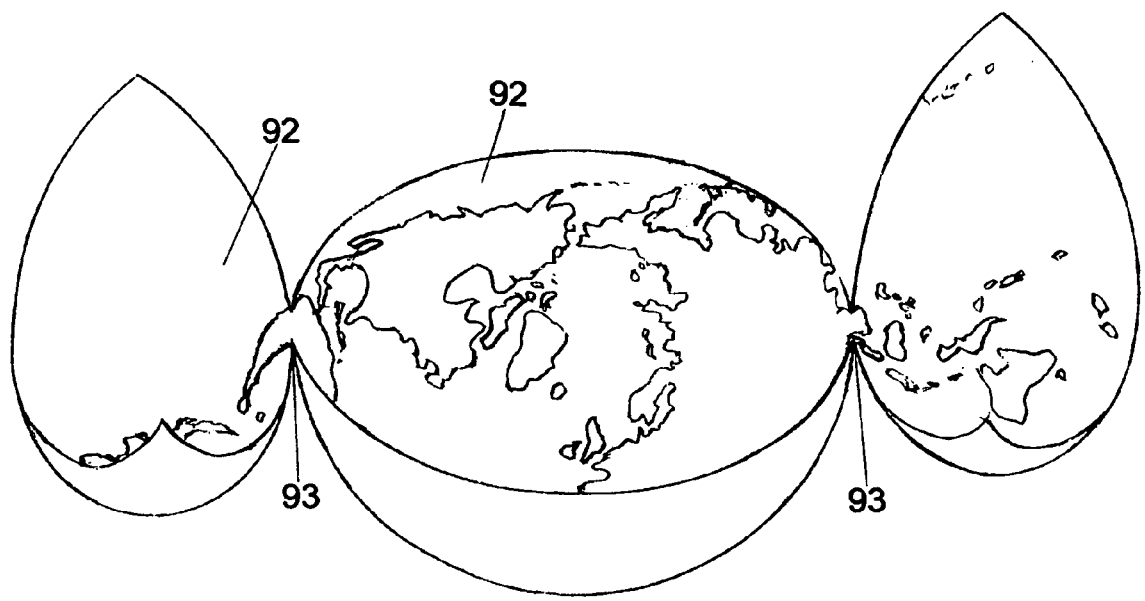

FIG. 27 is a view of an outside-in globe that was cut along the borderline between the continental-oceanic hemispheres except the land areas, and then cut the oceanic hemisphere halves and opened inside out, using the principle illustrated in FIG. 26.

Figure 28:
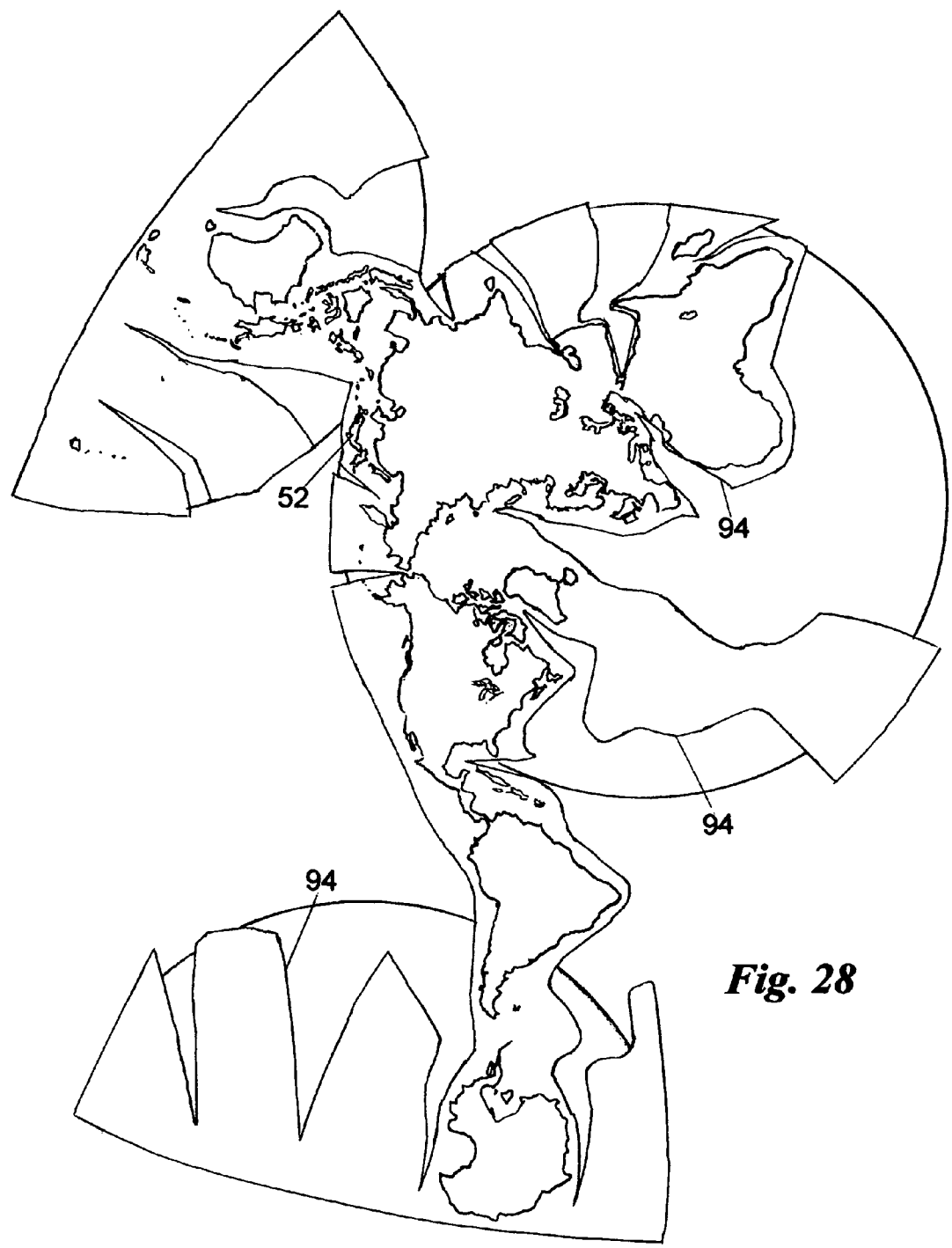

FIG. 28 is an illustration showing that cutting some ocean sections of the outside-in globe of FIG. 27 and spreading it as flat as possible make a world map with the least distortion.

Figure 29:
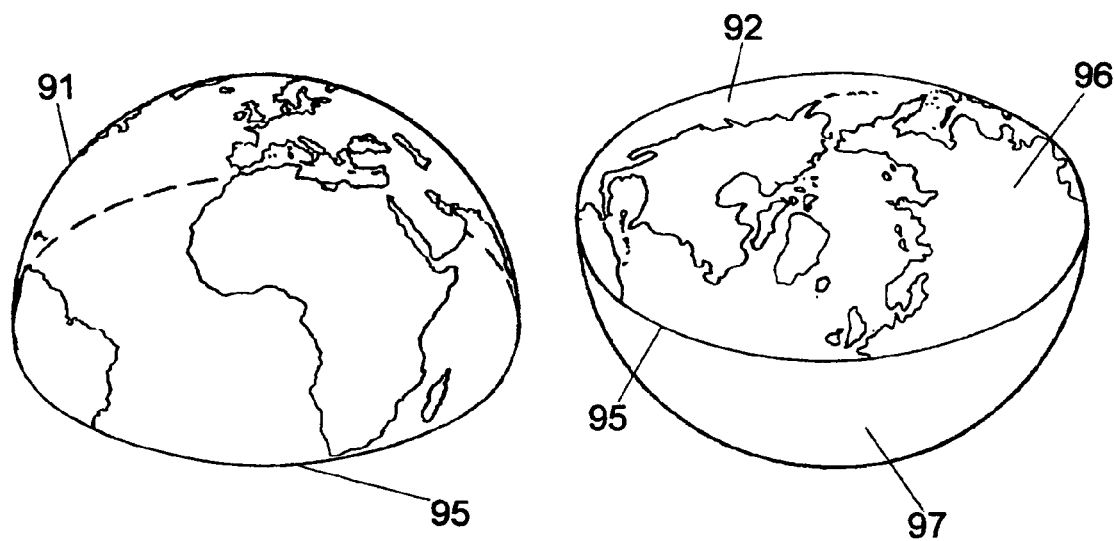

FIG. 29 is an illustration of two bowl-shaped hemispheres laid side by side; the similar contour of lands on the convex hemisphere is drawn on the inner wall of the other concave hemisphere, according to the invention.

SUMMARY

A map according to the invention is made by drawing a continental hemisphere map as a main body using an Azimuthal Equidistant projection and by attaching the landmasses of the oceanic hemisphere so that the interrupted landmasses of the main body are completed. In order to make the map, a map of a globe is facsimiled onto a graticule used for a Conic Equidistant projection. Then, this fan-shaped map is converted to a nearly flat disk with concentric accordion-like folds by connecting both edges of the sector together. By projecting the image of the disk onto a flat surface such as a piece of paper, one can make a hemisphere map on the Azimuthal Equidistant projection. Flat maps can be produced using several methods so that there is minimum distortion, along with a lantern-like collapsible globe and outside-in globes.

DETAILED DESCRIPTION

Preferred Embodiment

FIG. 1—Earth's Continents

As mentioned, I believe that in the early stage of the earth's history, a gigantic meteor-like body (hereafter called "Yasoon") broke up in the air and fell as chunks of lava onto a proto-earth covered solely by an ocean. The proto-earth is defined here as the earth without the continents. For this hypothesis, I provide the map of FIG. 1, which shows all of the earth's continents clearly. The shapes of the continents serve as evidence showing that the above process actually happened, in the same way that scientists can infer modes of living of lost creatures from shapes of footprints. I will discuss this in more detail later.

For the map of FIG. 1, oceanic hemisphere 40 of FIG. 2, which is discussed below, is divided into three sections; one contains parts of South America 41 and Antarctica 42; another contains parts of peninsulas and islands in South-East Asia 43, Australia 44, and New Zealand 45; the third section contains Hawaiian Islands chain 46 and Emperor Sea Mounts 47. These three sections are connected at each matching junction to main body 48.

The Emperor Seamounts are a line of submerged volcanoes in the northern Pacific. Although they are invisible from the surface, I drew them in this map because this Hawaiian-Emperor Islands chain is very important to the currently predominant theory of plate tectonics.

Then I drew main mountain ranges 49 on the continents to show their structure at a glance. This map provides an excellent showing as to how all the continents and mountain ranges connect systematically as a whole. This indicates that the continents originated concurrently. Moreover, their roundish contours imply a similarity to meteor-induced craters. While ring-forming craters are made by impacts with solid objects, I surmise that in the case of the continents, clear-cut contours were not formed because the objects that fell onto the proto-earth were mainly molten lava.

All three branched off sections 50 from the main body have the common trait of bending counterclockwise. I believe the revolution of the proto-earth had some momentum effects for their formation. Note that this map is well balanced, giving the appearance of a giant bird that spread its wings.

Figure 2:
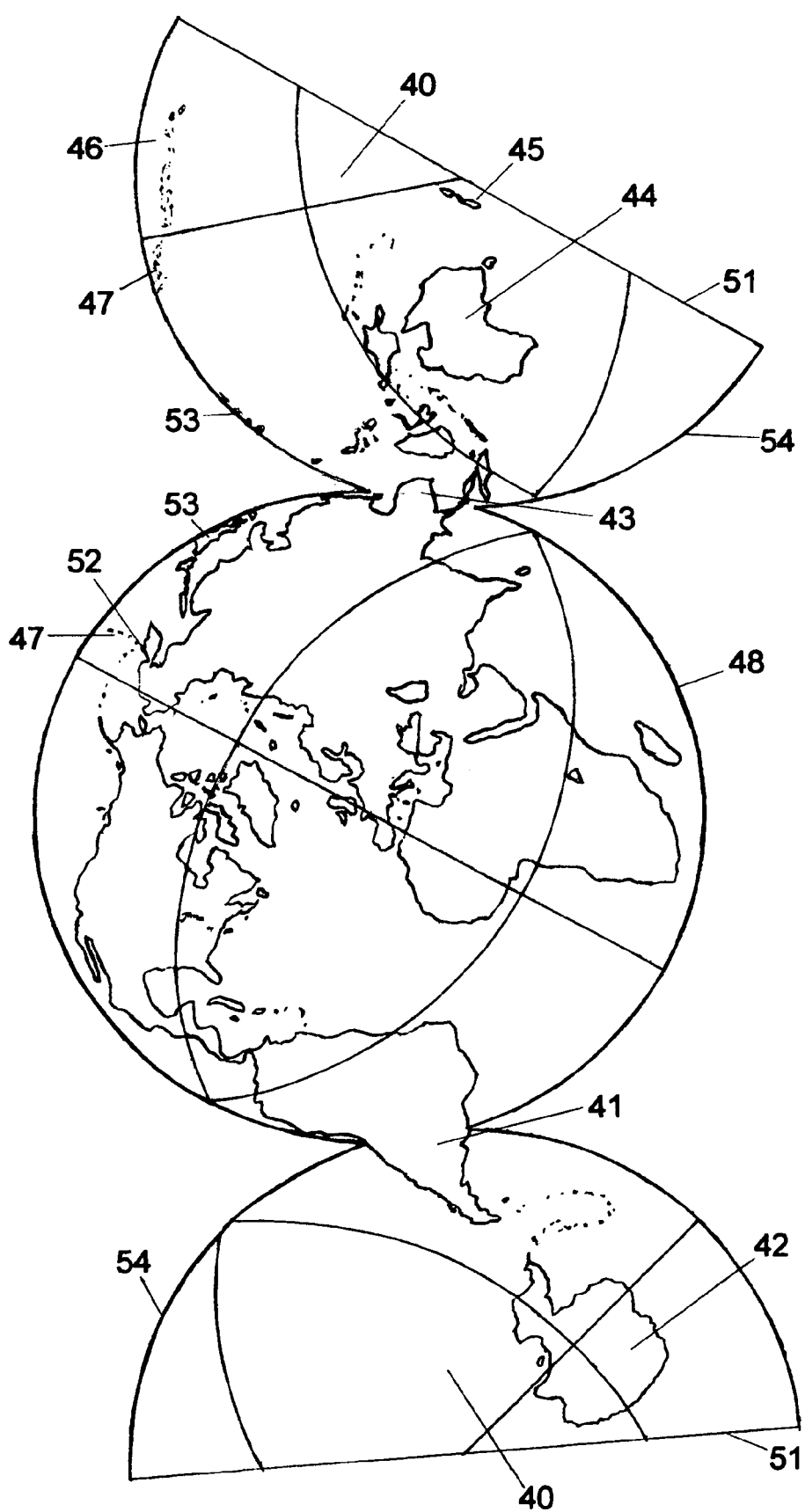
FIG. 2 is a world map according to the invention produced from a disposition of disks of the hemispheres in FIG. 15.

FIG. 2—World Map Over Continental Hemisphere

FIG. 2 shows what I call a "world map over the continental hemisphere". I made this map by placing continental hemisphere 48 on the Azimuthal Equidistant projection as a main body and oceanic hemisphere 40 on the same projection to be divided in half and attached to the main body so that the interrupted landmasses of the main body are completed. The division of the oceanic hemisphere is made along a line 51 between Antarctica 42 and New Zealand 45, and completion of the interrupted landmasses is made at South American continent 41 and at South-East Asia 43. This method of producing a world map may be applied to depict a landscape of any other planet, such as Mars and Venus.

Although the world map of FIG. 2 distorts the shapes of the continents somewhat, the distortion is mild and is less than in most other projections. It is especially good in showing the relative sizes of the other continents.

Fuller's Dymaxion world map claims no visible distortion, but it looses an important feature of the earth, which is its roundness. Contrary to this, my world map is made to remind the viewer of the earth's roundness by showing a circle representing the earth.

Fuller also claims that his map has the ability to show the shortest air routes between landmasses, but my map is far better in this respect. In his map, it is very difficult to figure out the shortest air routes where blocks are not contiguous to each other. Contrary to that, as the outlines of my world maps are so simple, constituted by one circle and two semicircles, it should not be so hard to guess such air routes between places beyond boundaries. My map may be ideal as a cabin map for international flight.

Another strong point for my world map is that it can be viewed with equal value from all four surrounding directions or sides. This breaks a prejudice created by north-at-the-top world maps. Similarly to Fuller's map, mine does not have any "upside down" and so people can choose any favorable side. When it is viewed vertically, as FIG. 2 indicates, the North American continent stands straight and fits snugly in a file or a binder.

Derivation of FIG. 1 from FIG. 2

Although the map of FIG. 2 may have broader uses as a world map, it is not sufficient to support my hypothesis. So I developed it further as shown in FIG. 1. I separated in FIG. 2 Hawaiian Islands chain 46 and a part of Emperor Seamount 47 from one of the oceanic semicircles containing Australia 44 and connected it to the rest of Emperor Seamount in main body 48 beginning at west end 52 of the Aleutian Islands. I also did the same to Japanese Islands 53 and other interrupted islands in East Asia.

Another major difference of the map in FIG. 1 from the map in FIG. 2 is the disappearance of the ocean. It was a quite surprise that a simple action like translocation of islands and erasing borderlines 54 of semicircles for the oceanic hemisphere produced such a major effect as the disappearance of the ocean. Now all the continents and major landmasses of the oceanic hemisphere have branched off from the main body of the continental hemisphere. The map of FIG. 1 clearly features landmasses of the world against the background of earth's sphere. It looks as if the landmasses were peeled off and they floated in the space over the planet earth. It also shows that the world is one and the continents are all united. Thus, I call the map of FIG. 1 a "map of the earth's continents" or "profile of the earth's continents".

Figure 3:
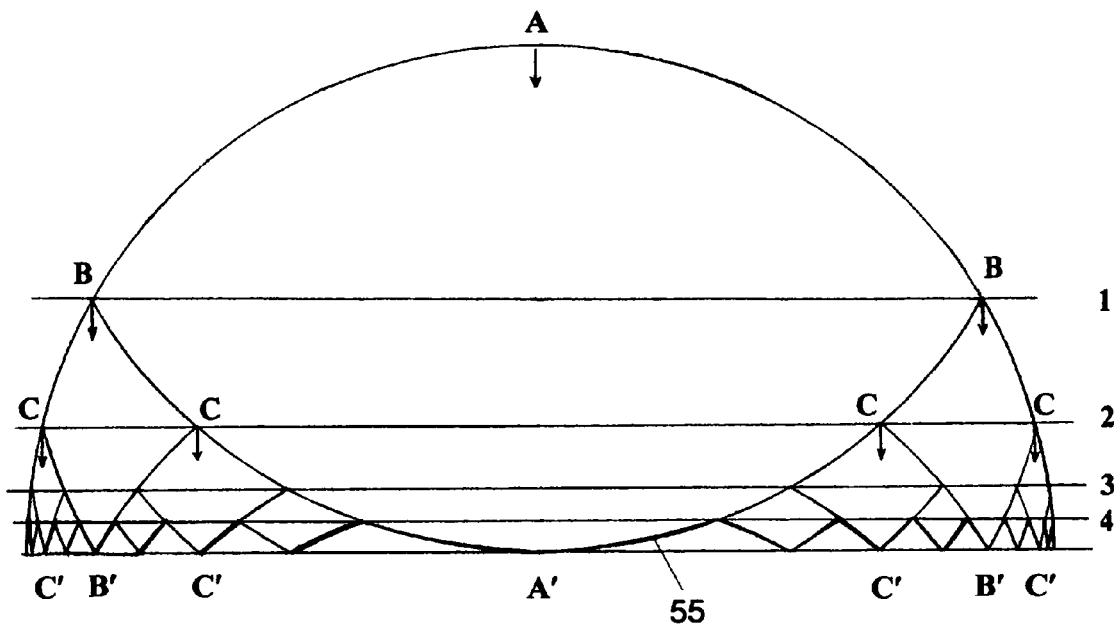
FIG. 3 illustrates a method according to the invention of the making of a disk hemisphere.

Method of Manufacturing Near-Flat Disk-Shaped Globe—
FIG. 3—Flattening Hemisphere In order to make the world map of FIG. 2, I developed an easy and efficient method to produce a hemispheric map on the Azimuthal Equidistant projection. When I flattened a hemisphere by pushing down its apex, the height of the hemisphere became half. I folded it again repeatedly so that the height became ¼, then ⅛, then 1/16, and so on. FIG. 3 illustrates a method of converting a hemisphere into a disk-like shape. An apex A of a semicircle is pushed down to a ground plane A'. Then, two new apices B are pushed down to their corresponding points B' on the ground. By repeating this same procedure, the height of the semicircle is reduced to half each time. Serrated bold lines 55 in the lowest row indicate the final cross section.

Figure 4:
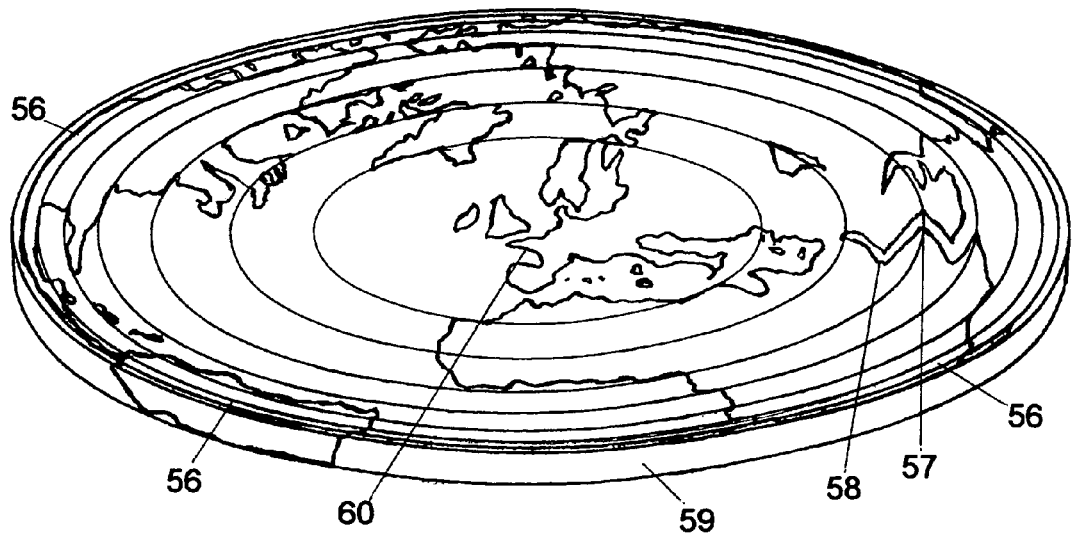
FIG. 4 is the perspective view of a disk hemisphere, according to the invention. The serrated row of FIG. 3 is equivalent to a cross section of this disk hemisphere.

FIG. 4—Disk-Shaped Hemisphere in Perspective

The continental hemisphere flattened by this process is shown in perspective in FIG. 4. Note that some parts of the continents around their peripheral portions 56 cannot be seen. Also note that contours of continents are abruptly bent at highest spots 57 and lowest spots 58 of this flattened continental hemisphere. This disk-shaped hemisphere has the thickness of outmost rim 59 all the way to center 60.

In other words, this process makes a nearly flat disk out of a hemisphere. Although this method was designed for the continental hemisphere, it is also applicable to any other type of hemisphere. By placing the opposing hemispheres back to back, I can provide a nearly flat, disk-shaped globe. This disk-shaped globe is handy, portable, and may be used as a hanging mobile, a CD case, or an ornamental object. Also, by refining the folds, a LP-record-like disk-shaped globe may be produced.

Figure 5:
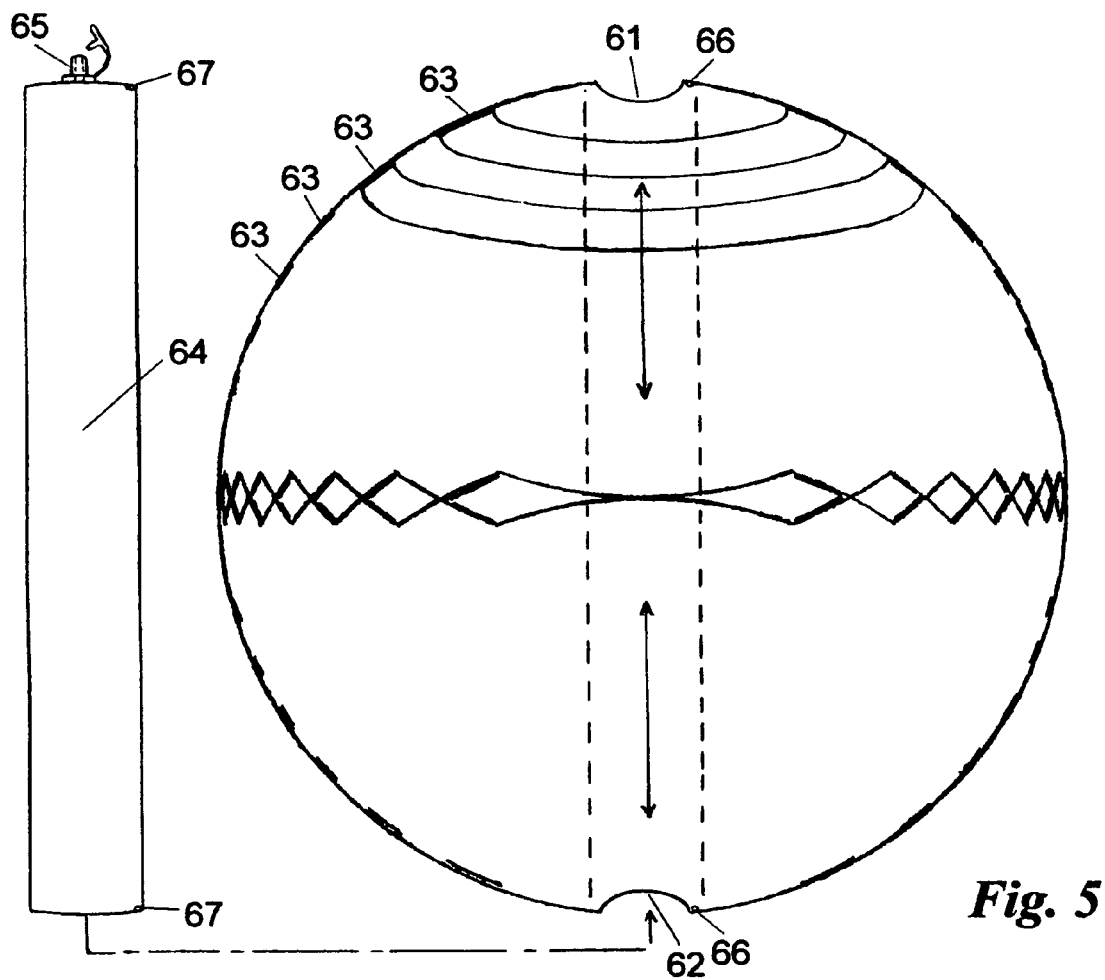
FIG. 5 is a cross section view of an instantly inflatable collapsible globe, according to the invention. This globe is produced using the disk hemisphere of FIGS. 3 and 4.

FIG. 5—Lantern-Like Collapsible Globe

Also, a lantern-like collapsible globe can be provided using the techniques discussed. By attaching bands of hoops for reinforcement to the back of outer folds, I can make a plastic lantern-like globe that instantaneously becomes a near-flat disk so to be kept in an attaché case or a flat bag. FIG. 5 shows such a globe in a sectional diagram. A top vent 61 and a bottom vent 62 are shown as holes. Reinforcement hoops 63 are made of a rigid material with some resilience, such as plastic, cardboard, or bamboo, and the hoops are cemented to the inner wall of this globe. Preferably, they are made of the same material with the other surface part and the difference of thickness is produced by grooves of a mold. Two such hoops are shown; other hoops omitted for simplicity. Bold lines indicate their positions. By pushing the top and the bottom, I can make the globe a nearly flat disk. And also, I can easily restore the original shape by pulling each vent at the top and the bottom. This solves the problem of a currently available plastic balloon globe that is difficult to inflate to a full sphere.

Furthermore, vents 61 and 62 are filled from inside by both ends of an elongated inflated balloon 64. Thus, this lantern-like globe can stay round by support of the balloon. Since this balloon requires far less air than an ordinary inflatable globe or round balloon, it is not difficult to inflate and deflate.

FIG. 5 also shows that balloon 64 has the same length as the diameter of the globe and has an air valve 65 on one of its ends. Preferably, this balloon is half-fixed to spots 66 of the globe at corners 67 of the ends by cementing spots 66 and corners 67 together, so that it functions as a prop when inflated, yet does not interfere with the function of vents when deflated.

FIG. 6—Dividing Semicircle

The disk globe, however, has the same problem in that the shapes of the continents cannot be seen evenly. To even the spaces between folds, I divided a semicircle into two small semicircles without changing its length of the circumference. The circumference of a semicircle is equal to the total circumference of two small semicircles of half radius: $1\pi r = \frac{1}{2}\pi r + \frac{1}{2}\pi r$. This means that the total length of circumference of the divided semicircles, no matter how many times divided, is always the same as the length of the circumference of the original semicircle. Now we can follow the aforementioned process and reduce the height of the hemisphere, by one half, one quarter, ⅛, and so on.

FIG. 6 shows that we can reduce the height H half by dividing a semicircle SC into two small semicircles SC1, since the circumference of a semicircle SC is equal to the combined circumference of two small semicircles SC1. FIG. 6 also shows the next step of dividing the two small semicircles SC1 into four smaller semicircles SC2. The smaller circles generated by the rest of the process are not designated. Corrugated bold lines 68 in the lowest row indicate the final cross section.

FIG. 7—Serrated Lines and Corrugated Lines

Comparing the corrugated lines in FIG. 6 with the serrated lines in FIG. 3, we notice that the ridges and valleys in FIG. 6 seem as if the ones in FIG. 3 have shifted toward the central point from the outer rim. FIG. 7 shows that ridges 1 to 8 of the pushed down disk in FIG. 7A seem to shift from outer rims L to the central point O of the divided semicircle disk in FIG. 7B. The ridges of the latter figure are shown as 1' to 8'.

FIG. 8—Semicircle, Parabola and Triangle

It is not necessary to have small semicircles to form a near-flat disk. Parabolas or a triangle of the same length will replace them. FIG. 8C shows that we can replace a semicircle SC by many parabolas PB1 and PB2 or a triangle TR as far as lines L-O-R are the same length. So, the semicircular disk in FIG. 7B is replaced by the parabolic disk in FIG. 8D or the triangular disk of FIG. 8E. Incidentally, a semicircle and a triangle are special cases of parabolas.

FIG. 9—Alternating Wave Patterns

We can also alternate the semicircle and the parabola to form wave patterns. FIG. 9 shows that the semicircular disk in FIG. 7B and the parabolic disk in FIG. 8D become disks of wavy patterns in FIG. 9F and in FIG. 9G, respectively, by alternating their ridges. Note that ridges 2', 4', 6', 8' in FIG. 7B are upside down in FIG. 9F. I did not show any figure with alternating triangular disks since its pattern will be apparent.

FIG. 10—Gores for Hemisphere on Flat Surface

Considering semicircles, parabolas, and triangles, the easiest one to handle is triangles. So to make a disk of triangular serrations as shown in FIG. 8E, first, I measured the circumference of a 30.48 cm-diameter globe. It was approximately 96 cm. Searching for a spot on the coast of France at the river Loire, I pinned it as the central point of the continental hemisphere and drew a circle of a diameter half of that circumference (48 cm) using a thin flexible ruler. This is a great circle for the continental and the oceanic hemispheres, which is equivalent to the equator for the north and the south hemispheres. Then I drew another circle of the same length on drawing paper. I divided the circle on the globe by 32 (3 cm) and drew straight lines along the curbed surface of the globe radiating from the central point. Then on the paper, I drew 32 evenly spaced gores having the same length (3 cm) of arc 69. FIG. 10 shows that 32 gores $G_1$ to $G_{32}$ are placed evenly on a flat surface in responding to the 32 divided sections on the globe.

FIG. 11—Making Wide-Open Fan

When I drew these radiating lines on the drawing paper, I realized that they didn't have to be separate from each other as shown in FIG. 10. Since they are straight lines, we can gather them up to form a wide-open fan that subtends an angle of 229°11' as shown in FIG. 11. FIG. 11 shows that gores can be gathered up to form a wide-open fan. Gores $G_1$ and $G_2$ of FIG. 10 moved up rightward in FIG. 11 and gores $G_{31}$ and $G_{32}$ of FIG. 10 moved up leftward in FIG. 11. But the movements of other gores were omitted. The circumference 70 of arc L-R-M in FIG. 11 is 96 cm, equal to the total length of small arcs of gores in FIG. 10 and also equal to the great circles of the globe.

FIG. 12—Graticule for Conic Equidistant Projection

At the next step, I drew 16 evenly spaced concentric lines including aforementioned great circle on the globe. Then on the drawing paper, I drew 16 evenly spaced concentric arcs 71 and then I copied the contours of landmasses on the globe onto the fan. This map on the fan is equivalent to a hemispheric map on the Conic Equidistant projection. After the map of the continental hemisphere was completed on the drawing paper, I notched the backs of those 16 concentric arcs by a compass with two sharp points.

Then I cut out this fan, which is shown in FIG. 12. However the map is omitted. FIG. 12 shows that the wide-open fan now has concentric arcs, radiating lines and hemispheric map on the Conic Equidistant projection (omitted) on it and concentric notches on its back. This fan with arcs and lines (but without a map) is equivalent to a graticule for a Conic Equidistant projection.

FIG. 13—Converting Fan to Disk

I bent the paper up and down alternately along the concentric arcs and pulled the both ends of radiating lines (L-O and M-O) inward as shown in FIG. 13, so to close a sector between the radiating lines. This pulling motion converted the flat fan in FIG. 12 into a near-flat three-dimensional disk with accordion-like concentric folds. Note that radiating lines of FIG. 12 became serrated in FIG. 13 by folding. I can also make it convertible from the fan to the disk and vice versa by attaching a detachable means, such as a hook-and-loop fastener or hooks and holes on the radial edges of the sector.

FIG. 14—Equidistant Hemispheric Disks in Perspective

I made another disk for the oceanic hemisphere by using the same procedure described above. I show both hemispheric disks in perspective in FIG. 14. FIG. 14A shows the continental hemisphere and FIG. 14B shows the oceanic hemisphere. FIG. 8E is a cross section of half side of these disks. Concentric rings in these disks represent ridges 72 and between them there are valleys 73. Note that contours of continents are bent abruptly at these spots.

Both disks for the hemispheres constitute another type of a near-flat globe. But this time it has distortion unlike that in FIG. 4. Note that the intervals of the rings and the shapes of the continents are different from the ones in FIG. 4. However, I can use these near-flat disks as a prototype to produce the flat map of FIG. 2, since they are flat enough for a photocopier.

Extension of the Preferred Embodiment—FIG. 15—Viewing Floating Continents Diagonally The impression of the floating continents can be seen more vividly by raising this map and viewing it diagonally, as shown in FIG. 15. From this angle, the mere circle in the background of the continental hemisphere becomes a sphere 74, representing the earth without the continents. And I believe that this is the state just before Yasoon fell onto the proto-earth. After it broke up in the air, it spread out the way this world map shows. The continents in this map would stretch and envelop the proto-earth after they touched the ground.

FIG. 16—Rounded into Smaller Sphere

The continents must have had a three-dimensional reality in the same way as a carpet of tiger fur used to have a three-dimensional form. In other words, continents 75 can be rounded into a nearsphere. FIG. 16 shows that the continents can be rounded into a smaller sphere. Putting a sphere 76 inside the continents merely emphasizes the appearance of sphere. This may be the most likely figure right after Yasoon broke up about 4.5 billion years ago.

FIG. 17—Relative Size of Yasoon to Proto-Earth

I posit that Yasoon fell on the proto-earth and formed the earth's crust. Conversely, the size of Yasoon can be determined by the whole amount of the earth's crust. I calculate that Yasoon had a size between 1068 km radius 77 in Y1 (when the thickness of the earth's crust is assumed to be 10 km) and 1354 km radius 78 in Y2 (when the thickness of the same is assumed to be 20 km). FIG. 17 shows the relative sizes of Yasoon Y1 and Yasoon Y2 to proto-earth P. However, the size of the proto-earth cannot be distinguished from the earth's size, since they are within the range of error. I assumed the earth has a 6380 km radius 79 here.

FIG. 18—Process of Yasoon Coalescing with Proto-Earth

Reversing the direction of this process from FIG. 17 to FIG. 15 depicts how Yasoon Y has broken up, spread, and fallen onto proto-earth P step by step. FIG. 18 shows the process by which Yasoon coalesced with the proto-earth. In stage I, Yasoon began to break up in the space near the proto-earth. In stage II, it broke up as the rounded continents in FIG. 16 indicate. In stage III, Yasoon broke up totally and spread as the disposition of the present continents implies. In stage IV, Yasoon wrapped around the proto-earth in reverse of peeling off and became the earth. However, this is only one example of coalescence. Various other models are also possible. For instance, Yasoon may have touched the ground of the proto-earth before it spread out completely as shown in stage III.

Thus, the present system provides a very important tool to anyone who contemplates the origin of the continents.

Least Distortion Embodiments of the World Maps

Although the map of the earth's continents in FIG. 1 or the world map over the continental hemisphere in FIG. 2 is well configured, the shapes of the continents are a little more distorted than Buckminster Fuller's world map. So to reduce distortion, I provide four different approaches for that purpose. The results were better than expected and the ultimate distortion appears less than Fuller's. In other words, I believe they are world maps with the least distortion.

While working on this project, I discovered an important rule regarding the world map projection. In order to reduce distortion, we cannot avoid cuts. The relationship between the distortion and the cuts may be apparent when the map of FIG. 2 is compared to the map of FIG. 28. The more cuts that are made, the less the distortion. Considering this rule, I set up a few conditions: No cut through the continents, the least possible distortion, and provide a reminder of the roundness.

The modified methods are described in more detail below.

Method 1) Stretching Folds of Near-Flat Disk Hemisphere—FIG. 19

As FIGS. 3 and 4 show, the problem of the near-flat hemisphere is that we cannot see figures in its peripheral portions well, because its vertical elements increase toward the rim. One way to overcome this problem is to make a disk hemisphere with only the continent parts cut out and stretched out.

First, I made the near-flat disk hemisphere of FIGS. 3 and 4. The next step was to cut out the outer parts of the continents and make them stretchable. FIG. 19 shows the effect when outer contours 80 of the continents are cut and stretched outward. The contour of South America 41 is all cut out because of its nearness to the periphery. In practice, the continents do not stretch well without vertical slits 81 in the continents. Although some parts 82 of South America and South-East Asia 43 should strictly not be included in this figure, I added them for better appearance.

Thus, we can produce a low-cost disk globe of paper in which the shapes of the continents can be seen clearly all over. Although I only drew the continental hemisphere in FIG. 19, we can make a world map if we add and lay the continents of the oceanic hemisphere properly.

Method 2) Rosette of Gores—FIG. 20

A second method is to make a rosette of gores and draw a world map on it. FIG. 20 is a rosette of 32 gores 83 on which the contours of lands are drawn. Note that the gores of FIG. 10 for a hemisphere are equivalent to an inner half of this FIG. 20.

FIG. 21—Gathering Gores

Then, the continent parts are gathered by cutting out gores like samples 84 in FIGS. 21A and 21B. These figures show that the contours of the continents are acquired by gathering the gores appropriately. By laying out the continents properly, we can make a similar world map as the method 1).

Method 3) Shaving Off Curved Surfaces Out of Continents—FIG. 22

We cannot transfer a curved surface to a flat surface without distortion. If we shave off the convex parts of the continents, we can produce the almost flat contours of the continents. FIG. 22 is a cross section of a globe 85 when a convex part of a continent is shaved off.

FIG. 23—Copying Contour of Continent

In practice, continents are covered with a sheet of clear plastic and the contours of lands are fixed with pieces of transparent adhesive tape 86. FIG. 23 shows that the African continent was covered by a clear plastic and its contour was fixed by pieces of transparent adhesive tape. The contour of the continent was copied onto the pieces of transparent adhesive tape, then the contour drawn on the adhesive tape was copied to a piece of paper by a photocopier. Lines S-T in FIGS. 22 and 23 represent shaved off convex parts of the continent viewed from the side and the top along this line respectively. This example of the African continent will be extended to any other continents.

FIG. 24—Convertible Globe

This method of shaving off convex parts of continents has the following applications. First, I placed the paper copy of the continents on elastic material, such as a nylon stocking, and cut them along the contours of lands. Then on the back, I put a hem that was cut along the same contours of lands. The material of the hem should be rigid and flexible, such as polystyrene, cardboard, or wire. In this way, we can make patterns for each continent separated by straits and canals. These independent patterns of the continents are attached to the corresponding spots on a globe by a means of a hook-and-loop fastener, magnet, or something easily detachable.

If the globe is political, these detachable patterns of the continents should be physical and if the globe is physical, the patterns should be political. Thus, we can make a globe convertible. FIG. 24 illustrates the process of fabricating a continent as a part of a convertible globe using the African continent as an example. Elastic fabric 87 and polystyrene 88 are cemented together and they are attached to the globe by pieces of hook-and-loop fastener 89.

We can also place the pattern of the continents on any flat world maps of the same scale. By doing so, geography students can visually learn the effect caused by distortion.

Method 4) Map from Outside-in Globe—FIGS. 25 & 26—Convex & Concave Hemispheres

We cannot see the peripheral portions of a globe because our eyes 90 are at the center of a convex surface 91. FIG. 25 shows why we cannot see all the figures on a hemisphere of a globe. Conversely, if a globe has a concave surface 92, we can see the entire hemisphere of the globe at one look as shown in FIG. 26.

FIG. 27—Outside-in Globe

Using this principle, I made an outside-in globe. First, I cut an inflatable balloon globe in half along the borderline between the continental and the oceanic hemispheres, except the land areas, which include South America, South-East Asia, Japan, and others. Then, I cut the oceanic hemisphere half and open inside out as shown in FIG. 27. Thus, the global map on the surface of the balloon globe is now turned in on inner wall 92.

If we make this globe of rigid material with some accoutrements 93 such as hinges or pairs of strong adhesive tape, the resultant globe shows the whole world at a glance without any distortion at all. Thus, we can make a political globe with a physical concave globe inside, or vice versa.

FIG. 28—Cutting Ocean Sections of Globe & Spreading it Flat

At the next step, I cut ocean parts 94 of the balloon globe at several places and spread it flat. FIG. 28 shows that cutting some ocean sections of the outside-in globe and spreading it as flat as possible make a world map with the least distortion. In practice, I tried not to cut through major islands in East Asia, such as Japanese Islands 52. It is arbitrary where and how many spots we should cut. Because of this arbitrariness, it is possible to cut them so that the continents may have less distortion than in any other flat world maps.

FIG. 29—Two Bowl-Shaped Hemispheric Maps

As a supplement to the above method, I add versatile globes made of two hemispheres. If an ordinary globe is cut half along a borderline 95 between two hemispheres, we have two bowl-shaped hemispheres since the inside of the globe is hollow. I drew the map of continental hemisphere 96 on inner wall 92 of oceanic hemisphere 97. The size of the map was reduced in relation to the size of this concave wall. The map of the oceanic hemisphere should be drawn on the inner wall of continental hemisphere 91. But the maps of the oceanic hemisphere are omitted in both hemispheres.

We can use this globe as an ordinary globe when the two hemispheres are combined. If we lay these hemispheres side by side, we can examine places and countries while seeing them at the exact proportion to the whole. FIG. 29 shows two bowl-shaped hemispheres are laid side by side. The similar contours of lands on the convex hemispheres are drawn on the inner walls of the other concave hemispheres.

Although I mentioned the case of a continental hemisphere, we can replace it with any hemispheres, such as northern-southern or eastern-western hemispheres. If there is a 3-D computer graphic, this set of convex-concave hemispheres works ideally. When we roll the map on the convex hemisphere, another map on the concave hemisphere moves around synchronously. Naturally, these hemispheres are made with any combinations of physical, political, graphical, pictorial or photographical images.

CONCLUSION, RAMIFICATION, AND SCOPE

Thus it is seen that my world maps provide the best showing of the earth's sphere on a flat surface. It enables us to see at a glance the shapes of the continents without breaks within any continent, which are all united as a single unit. This in turn proves the continents originated concurrently and were not displaced horizontally since then. Otherwise, their original shapes would never have remained intact.

My methods of manufacturing world maps and the other embodiments disclosed are designed for wide use in providing innovative world maps and globes. They also help people to view the world totally differently and let them rethink of foundation of the accepted theories.

Although the above description contains many specificities, these should not be construed as limiting the scope of the invention, but merely as providing illustrations of some of the presently preferred embodiments. Many variations and ramifications are possible.

Disk-shaped hemispheres can be replaced by any other pair of hemisphere, such as northern-southern or eastern-western. These disk-shaped hemispheres also may be made by other projection, such as Azimuthal Equal-area.

The number of folds to produce a disk-shaped hemisphere can be greater or fewer. Although I only described a case of fourth fold, the more the folds, the finer the resulting disk hemisphere may look.

The collapsible globe can have other types of support, such as a tubular balloon in place of the elongated balloon to prop the inner wall of the globe. Or the support can be provided by a doughnut-shaped balloon attached to the inner wall of the globe in a way crossing the reinforcement hoops at right angles. Adding some lined sections on the inner wall of the globe and inflating into space between the lined and the inner walls may make the same effect as the support.

The notches along the accordion-like concentric folds of the near-flat hemispheric disk can be produced by compression instead of scratching as I described. The compressed notches make bends smoother than the ones made by the scratched notches. The cross section view of the compressed folds shows a shape of parabolic serrations while the same of the scratched folds shows a shape of triangular serrations.

Although I have described the fabrication of flat projections using mechanical methods, such as cutting, folding, etc., they may also be created by computerized methods using a 3-D illustration program. The materials used for creation of the maps can be changed, as can their sizes and locations where cuts and pastings are made.

Accordingly the scope of this invention should be determined, nor by the embodiments illustrated, but by the appended claims and their legal equivalents.

I claim:

1. A method of making a map of earth's continents, comprising:
    projecting a curved or three-dimensional representation of the continental hemisphere onto a flat surface so as to form a two-dimensional representation of said continental hemisphere with at least one interrupted landmass, and
    attaching a plurality of similar projections of landmasses from the oceanic hemisphere so that said interrupted landmass of said continental hemisphere is completed, whereby said map will illustrate that the earth's topography was formed by collision of a gigantic meteor-like body.

2. The method of claim 1 wherein said projecting is done by repeatedly folding down a sphere half having concentric serrations to a near flat disk.

3. The method of claim 2 wherein said folding down is done by repeatedly dividing a semicircle, a parabola, or a triangle half into a plurality of smaller semicircles, parabolas, or triangles.

4. The method of claim 2 wherein said folding down is done by repeatedly dividing a ridge of semicircle, parabola, or triangle half into alternating pairs of a ridge and a upside down ridge, so to form wavy patterns.

5. The map of claim 1 wherein said projection is done by independently drawing said hemispheres on a Conic Equidistant projection, so to preserve relative sizes and disposition of said continents correctly and to show the shortest air routes more clearly.

6. The map of claim 1 wherein said completed continental hemisphere is formed by attaching of said landmasses with translocation of interrupted islands and deleting borderlines of said oceanic hemisphere, so to produce an effect of disappearance of the ocean and to feature said continents and landmasses clearly, conveying earth's roundness.

7. A method of converting a hemispheric map on the Conic Equidistant projection into a near flat disk having triangular serrations comprising:

folding a plurality of equal-spaced concentric arcs on said Conic Equidistant projection alternately so as to form a wide-open fan with concentric serrations, and selecting a sector of said map and pulling both ends of said sector inwardly so to close said sector, whereby said method will produce a nearly flat hemispheric disk that is thin enough for projection onto a flat medium.

8. The method of claim 7 wherein said folding is done along said concentric arcs in which said concentric serrations made by a plurality of notches.

9. The folding of claim 8 wherein said notches are made by scratching or compressing along said concentric arcs.

10. The method of claim 7 wherein said ends of said sector have a set of detachable means selected from the class consisting of hook-and-loop fasteners, hooks, and holes.

* * * * *